Dec. 18, 1951     D. G. KINGSLEY     2,578,936
BOX-PART MAKING MACHINE
Filed May 17, 1950     13 Sheets-Sheet 1
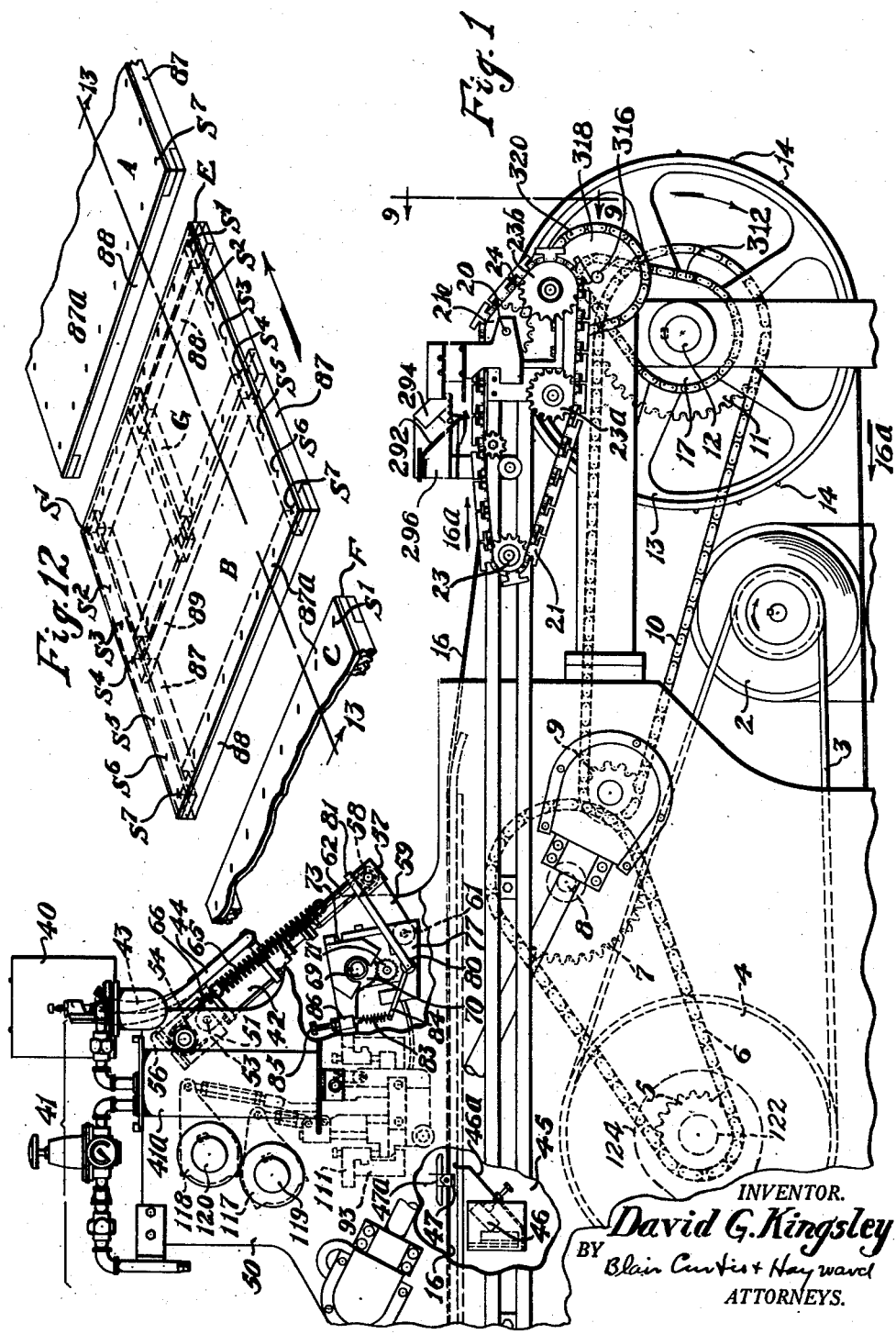
INVENTOR.
David G. Kingsley
BY Blair Curtis + Hayward
ATTORNEYS.

Dec. 18, 1951     D. G. KINGSLEY     2,578,936
BOX-PART MAKING MACHINE
Filed May 17, 1950     13 Sheets-Sheet 2
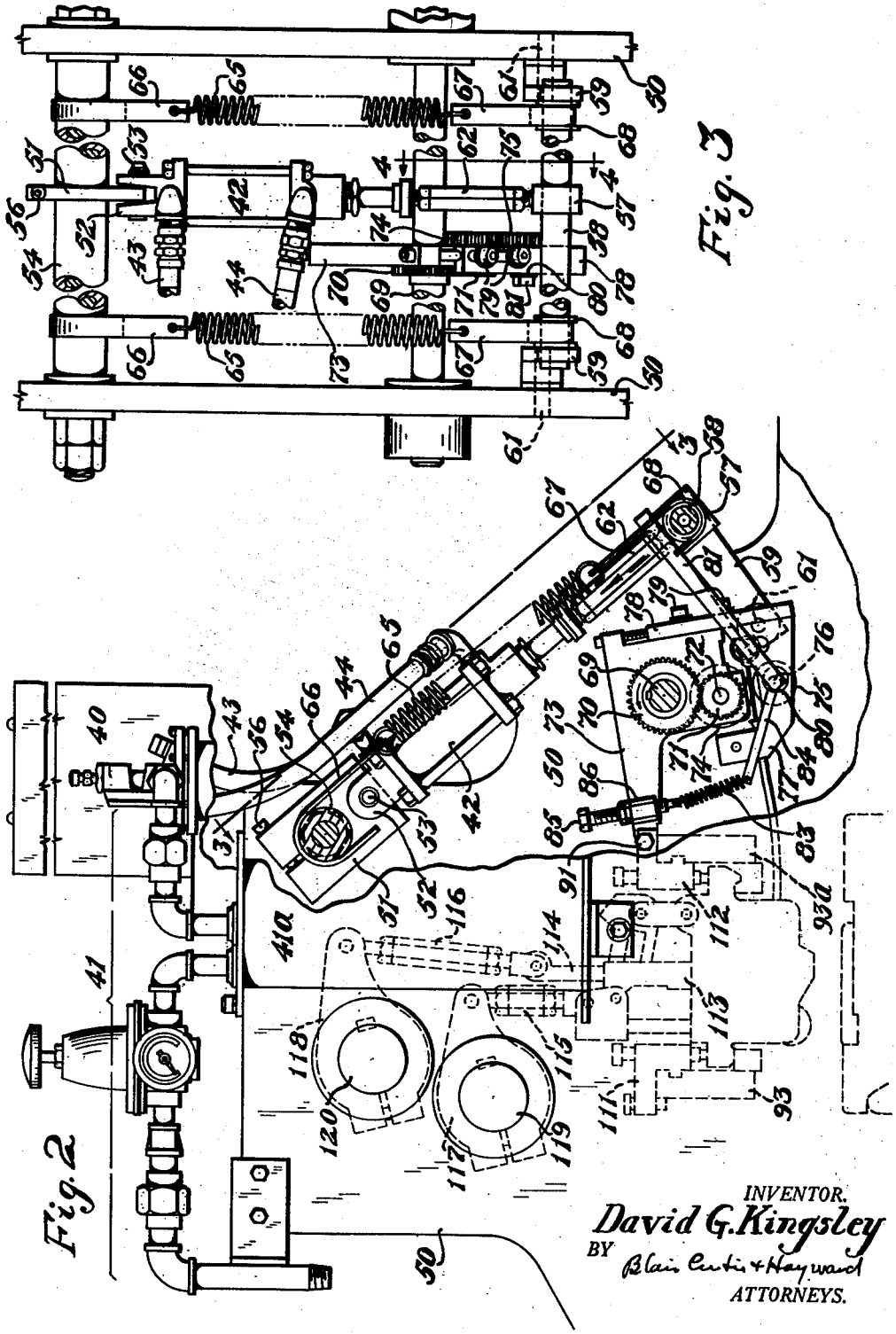
INVENTOR.
David G. Kingsley
BY Blair Curtis + Hayward
ATTORNEYS.

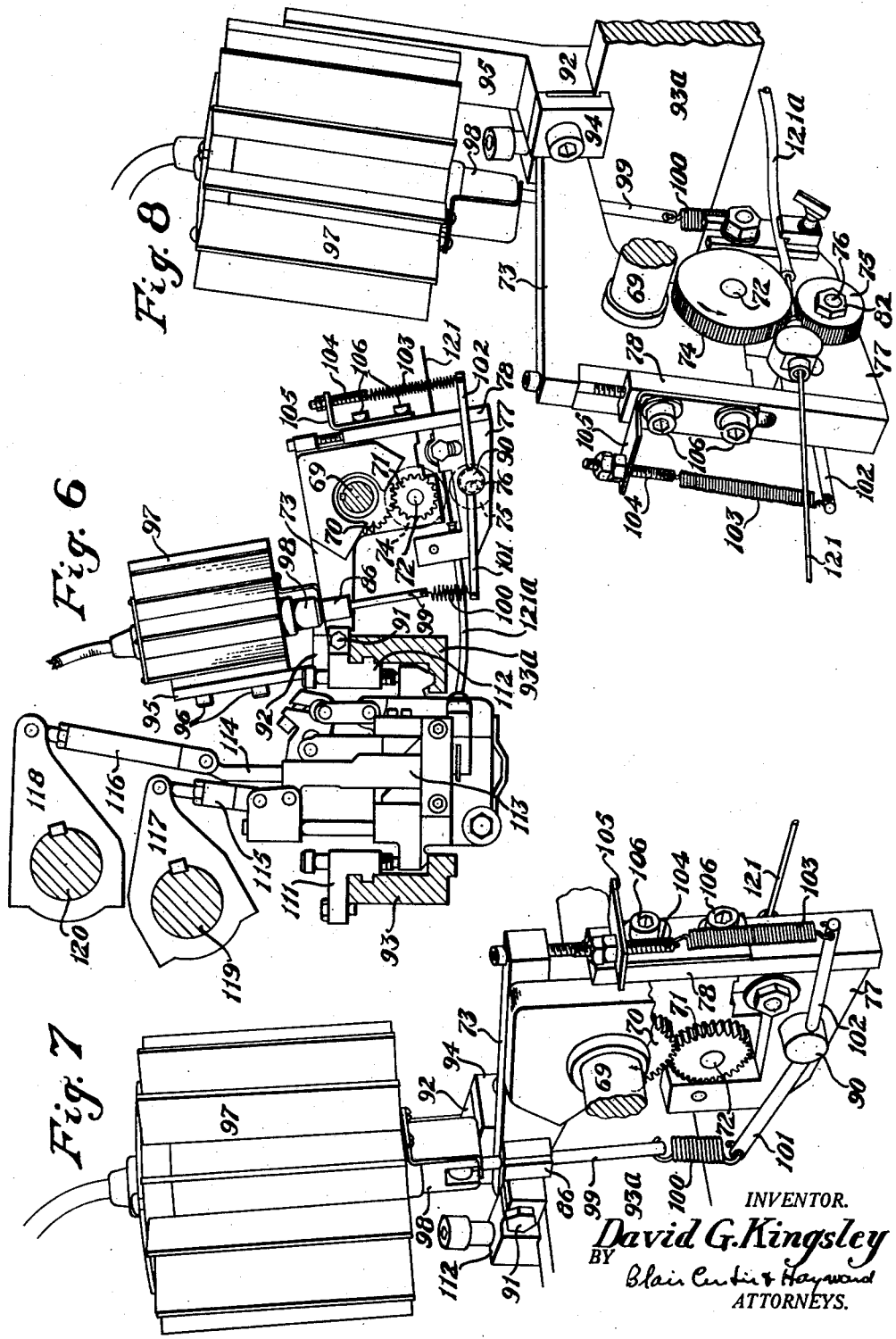

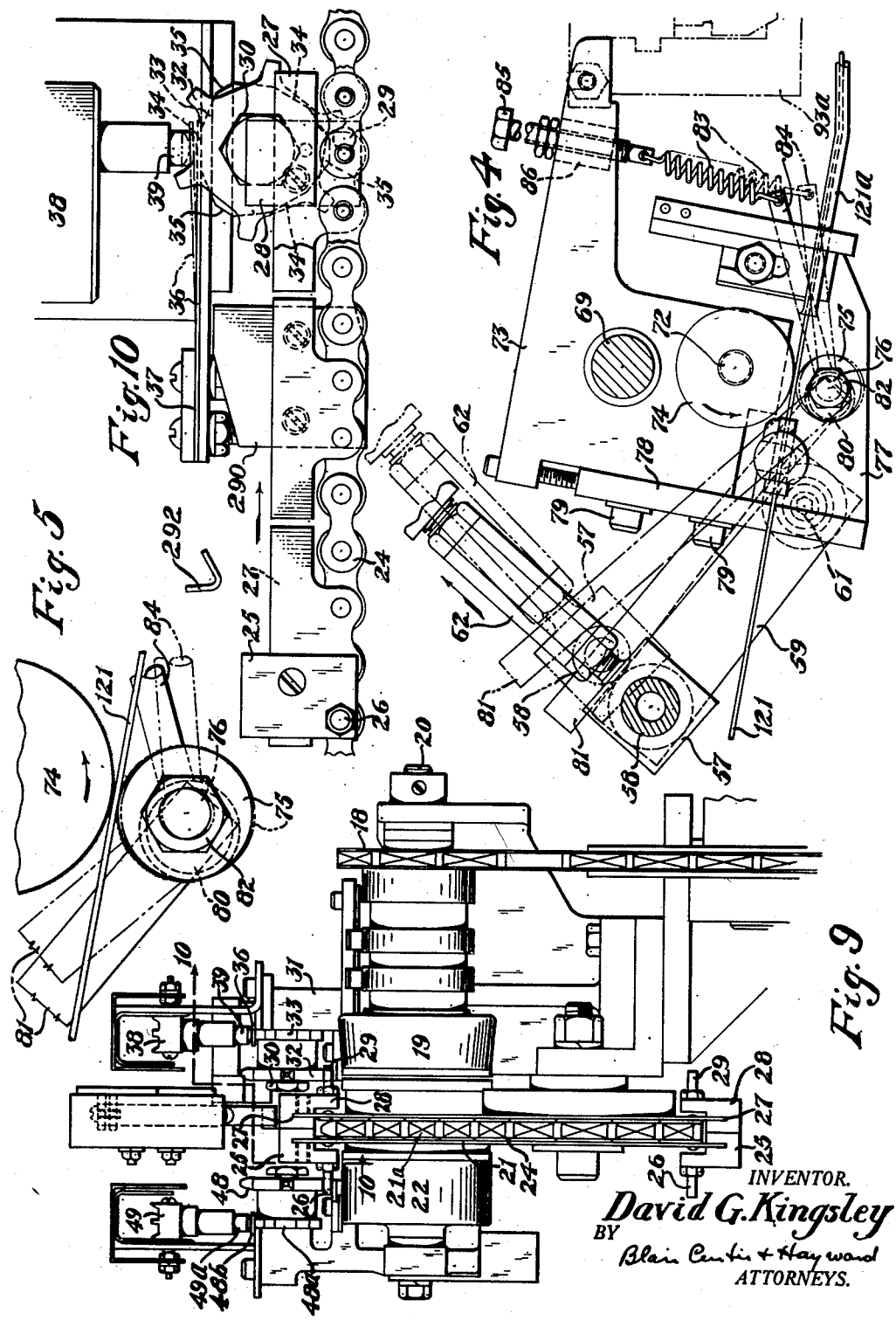

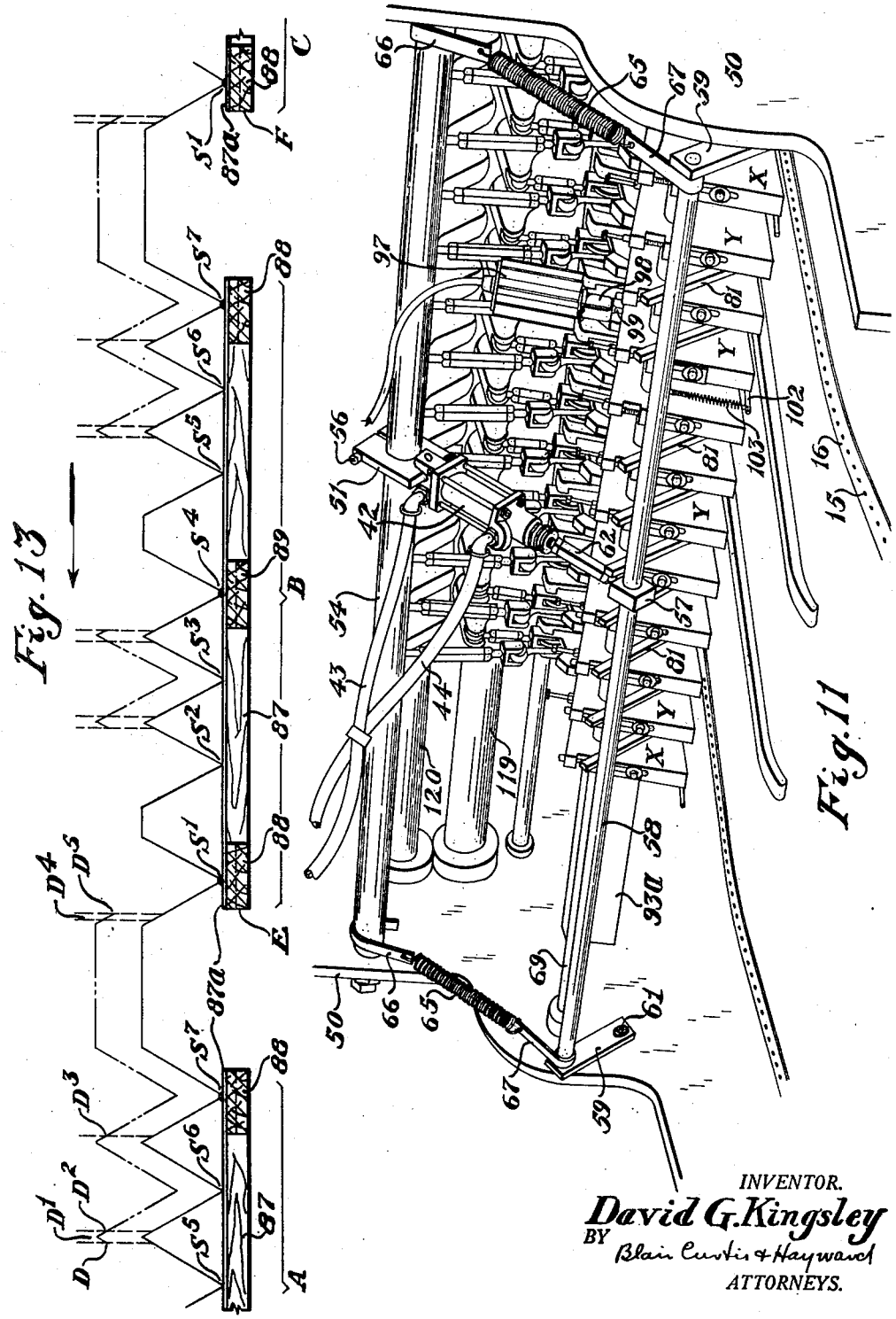

Dec. 18, 1951  D. G. KINGSLEY  2,578,936
BOX-PART MAKING MACHINE
Filed May 17, 1950  13 Sheets-Sheet 6

INVENTOR.
David G. Kingsley
BY Curtis, Morris & Safford
ATTORNEYS.

INVENTOR.
David G. Kingsley
BY Curtis, Morris & Safford
ATTORNEYS.

Dec. 18, 1951 — D. G. KINGSLEY — 2,578,936
BOX-PART MAKING MACHINE
Filed May 17, 1950 — 13 Sheets-Sheet 8

INVENTOR.
David G. Kingsley
BY Curtis, Morris & Safford
ATTORNEYS.

Dec. 18, 1951 D. G. KINGSLEY 2,578,936
BOX-PART MAKING MACHINE
Filed May 17, 1950 13 Sheets-Sheet 10
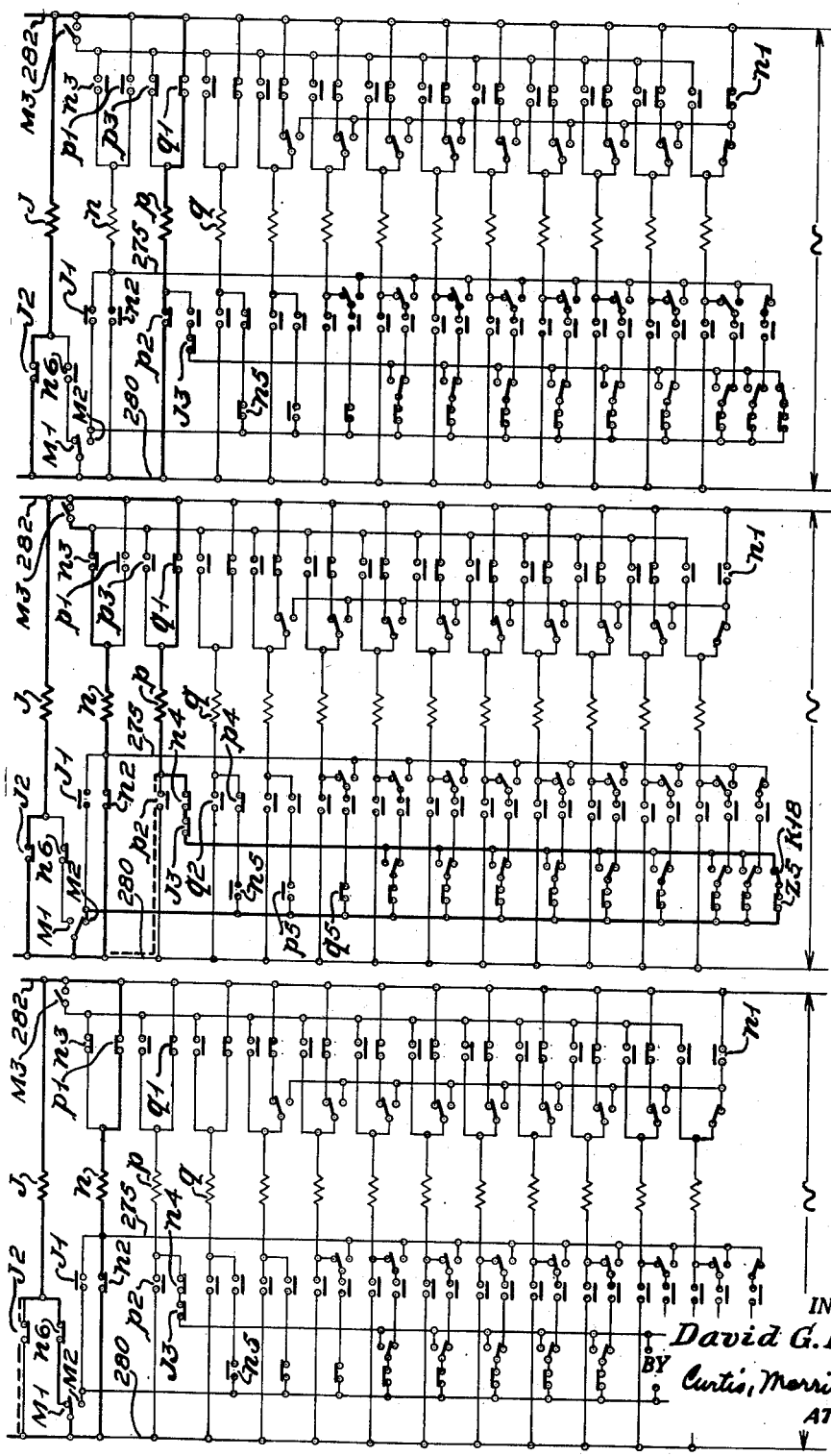
INVENTOR.
David G. Kingsley
BY Curtis, Morris + Safford
ATTORNEYS.

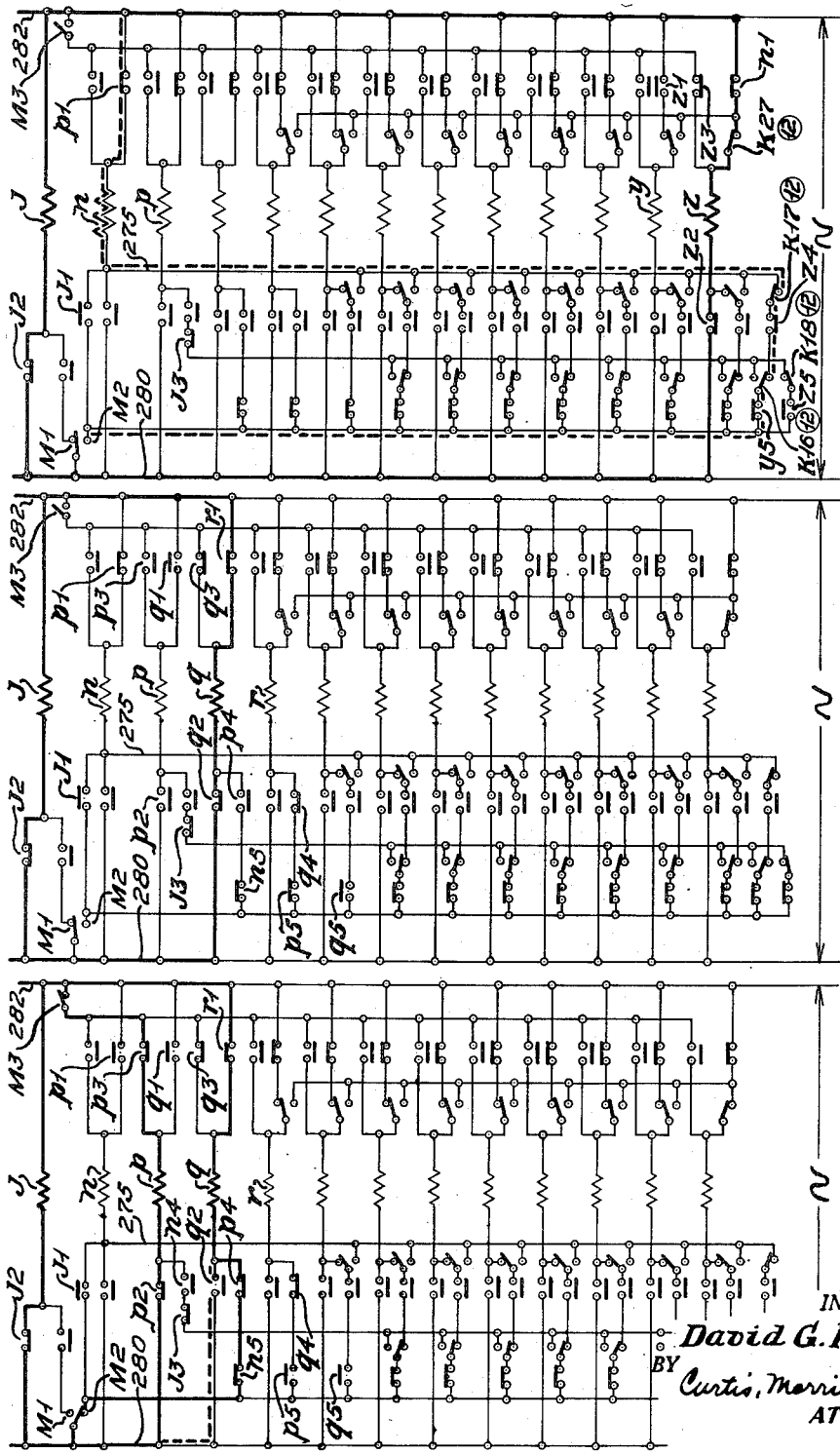

Dec. 18, 1951   D. G. KINGSLEY   2,578,936
BOX-PART MAKING MACHINE
Filed May 17, 1950   13 Sheets-Sheet 12

INVENTOR.
David G. Kingsley
BY Curtis, Morris & Safford
ATTORNEYS.

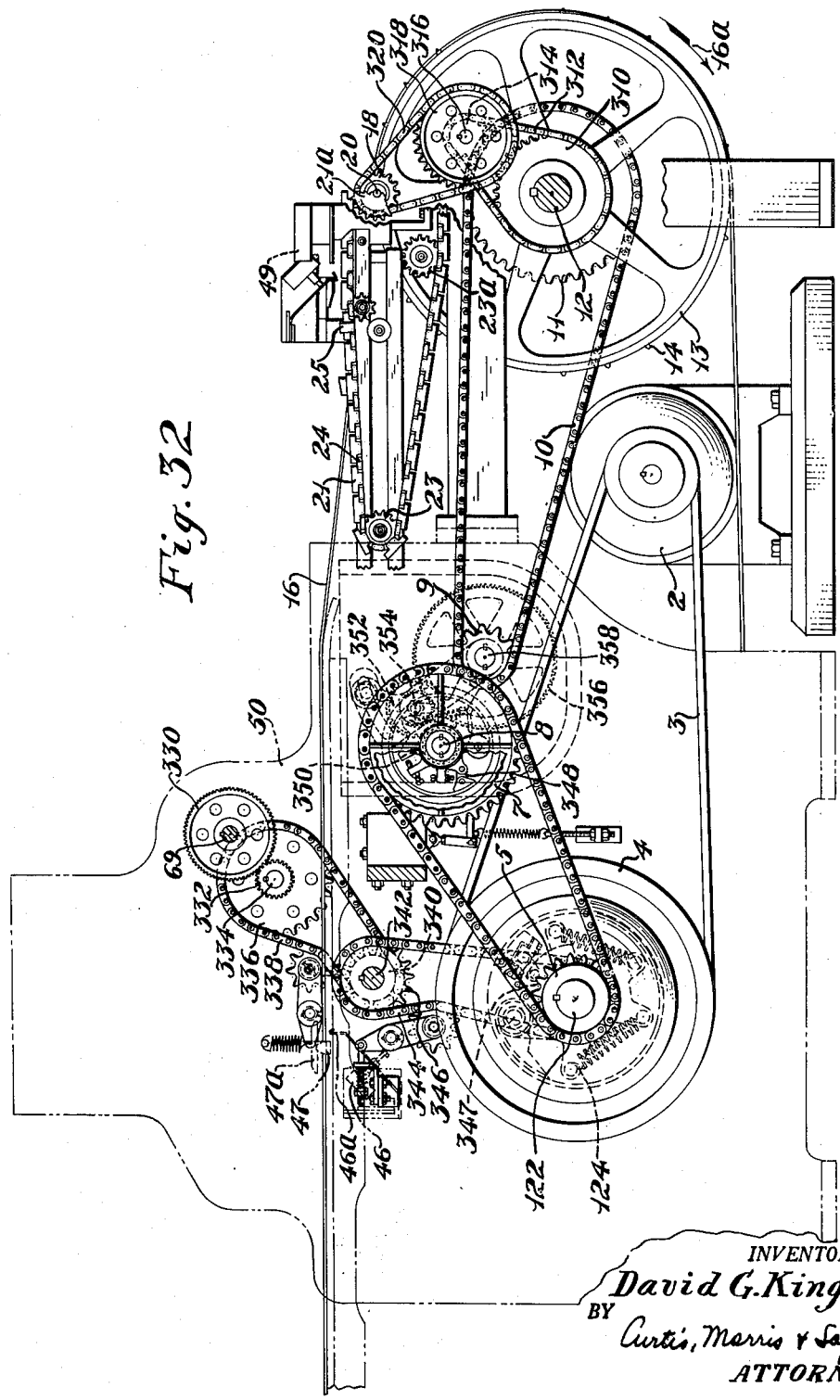

Patented Dec. 18, 1951

2,578,936

UNITED STATES PATENT OFFICE 2,578,936

BOX-PART MAKING MACHINE

David G. Kingsley, Mountain Lakes, N. J., assignor to Stapling Machines Co., Rockaway, N. J., a corporation of Delaware Application May 17, 1950, Serial No. 162,512

19 Claims. (Cl. 1—8.1)

The present invention relates to stapling mechanism for stapling together cleats, side material or other parts to form box-parts or box blanks such as may be used in boxes. More particularly, the invention relates to mechanism for stapling together box-parts so arranged that irregular stapling operations are required. This application is a continuation-in-part of application Serial No. 60,003, filed November 15, 1948, now abandoned.

The stapling mechanism, with which the present invention is particularly useful, comprises a bank of individual stapling units arranged side by side across a machine and under which stapling units box-parts to be stapled together are continuously moved by a suitable conveying system. To each stapling unit is fed a wire strand and the stapling mechanism of each unit acts periodically to cut a length from its strand, to form the length into a staple, and to drive the staple into the box-parts. A common drive shaft drives all of the units in synchronism. Starting and stopping of the common drive shaft is controlled by a suitable remote control system synchronized with the conveying system to start the stapling units when staples are to be driven and to stop the units when no more staples are to be driven. The stapling drive may be fixed at a constant speed, but by adjusting the speed of the conveyor system the spacing between staples driven by the stapling units while continuously operating may be adjusted within practical limits. Stapling units thus driven are disclosed in Rosenmund U. S. Patent 2,304,510, issued December 8, 1942.

The starting and stopping of the drive shaft for the stapling units may be controlled from control blocks secured to and movable by the conveyor system. But a remote control system is preferable because it eliminates the necessity of securing a large number of control blocks to the conveyor system. A remote pattern control system such as is shown in Rosenmund U. S. Patent No. 2,482,370, issued September 20, 1949, has demonstrated its usefulness for controlling the starting and stopping of the stapling drive shaft, so that staples may be spaced along the box-parts as described. The controls, however, whether placed on the conveyor system itself or placed on some remote control mechanism, in controlling the starting and stopping of the stapling drive shaft do no more than control the spacing between staples that are driven lengthwise of the box-parts moving past the stapling units. Consequently, such controls in combination with stapling units driven from a common drive shaft have not been satisfactory for stapling together box-parts requiring irregular operation of individual stapling units or groups of stapling units independent of the other stapling units to staple together box-parts requiring irregular stapling patterns.

For years a stapling mechanism has been used to drive staples in accordance with an irregular staple pattern across the box-parts passing beneath the stapling mechanism by controlling the operation of step-operating feed mechanism feeding staple wire stock to the individual stapling units. When it is desired to omit a staple, no staple stock wire is fed to the stapling unit which otherwise would make that staple. Thus, even though the stapling former and driver of that stapling unit are actuated, no staple will be driven due to the lack of wire. This is referred to herein as "staple throwout." The control of the individual feed mechanism has been from control blocks placed on the conveyor system or from control blocks carried by a remote pattern control. But such apparatus has been proposed only with continuously operating stapling units, i. e., units that are not started and stopped in accordance with a desired pattern of operation to irregularly space staples longitudinally along a box-blank being fabricated. As a result, with such apparatus it has not been possible to control the spacing of the staples lengthwise along the box parts, but only to selectively control the staples laterally across the box parts. For this reason it has been necessary to pass the box parts through two machines, first along one axis and then along an axis at right angles to the first axis, in order to obtain the desired irregular stapling patterns.

For this reason also, in the past when it was desired to produce corrugated panels or other structures requiring transverse bracing members spaced apart unequal distances, both laterally and longitudinally, for crates for shipping electric refrigerators, radios, motors, etc., and when it was required to fasten cleats at irregular locations to one or more of the interior faces of a wire bound box blank for bracing or for forming interior packing members to protect or confine contents of a wirebound box, it was customary either to nail such corrugated panels with a nailing machine or by hand, both operations requiring hand labor.

It is an object of the present invention to provide mechanism which controls both the longitudinal and lateral irregular spacing of the staples so that box parts to be stapled together and requiring irregular staple patterns may be stapled in one pass through the stapling machine.

It is another object of the present invention to provide for staple throwout of a continuously operating stapling unit by controlling the feed of the staple stock wire to obtain more reliable staple driving than has previously been obtained by discontinuous staple wire feed.

It is a further object of the invention to provide a staple throwout mechanism which is reliable, which may be added to standard box-making machines, is relatively inexpensive to build and to operate, and which is useful for fabricating a wide variety of box parts of different shapes and constructions.

It is another object of the invention to provide staple throwout control in conjunction with continuously operating staple wire feed mechanism to insure accurate feed of the wire stock when staples are to be driven.

It is also an object of the invention to provide a simple and inexpensive apparatus for selectively controlling the wire feed to a plurality of stapling units or groups of stapling units.

An additional object of the invention is to provide an apparatus for automatic control of the pattern of staples in box-part units made by the machine, wherein the desired stapling pattern may be changed conveniently and rapidly.

In general these and other objects are accomplished in the present invention by providing mechanism to control the feed of wire strands to the respective stapling units so that any one or more of the wire strand feeds may be stopped, thereby throwing out of operation the stapling units whose wire feeds are stopped, and controlling the starting and stopping of the stapling units to control the spacing of the staples longitudinally along the box parts passing beneath the stapling mechanisms.

Other objects will be in part obvious and in part pointed out as the description proceeds by reference to the drawings in which like reference numerals refer to similar parts throughout.

Referring now to the drawings in which are shown several embodiments of the invention, Figure 1 shows in elevation the right side of the output end of a box manufacturing machine, and shows air-operated mechanism embodying the invention secured in position to control wire feed mechanism of selected staple forming and driving units;

Figure 2 is an enlarged elevation, partly in section, of the upper left portion of Figure 1. A side wall of the machine is partially broken away to show more clearly wire feed mechanism and air-operated mechanism which cooperate to control the feeding of stapling wire stock;

Figure 3 is a view taken on line 3—3 of Figure 2, with some parts broken away and others omitted, showing the lateral position on the machine of the air-operated and wire feed mechanisms;

Figure 4 is an enlarged sectional view taken on line 4—4 of Figure 3 showing in full lines the position of parts while engaging the wire to feed it to the stapler unit and in dotted lines the position of the same parts while disengaging the wire feed;

Figure 5 is an enlarged view of knurled feed wheels shown in Figure 4;

Figure 6 is an elevation of the right side of an assembled staple forming and driving unit with its wire feeding mechanism, showing another embodiment of the invention in the form of an electrically-operated wire feed throwout device;

Figure 7 is a perspective view of a staple wire feed unit, with electrically-operated wire-feed-throwout device of Figure 6;

Figure 8 is a perspective view of the side of the staple wire feed unit opposite to the side shown in Figure 7, and showing the knurled feed wheels which engage and disengage the wire strand;

Figures 14, 15:
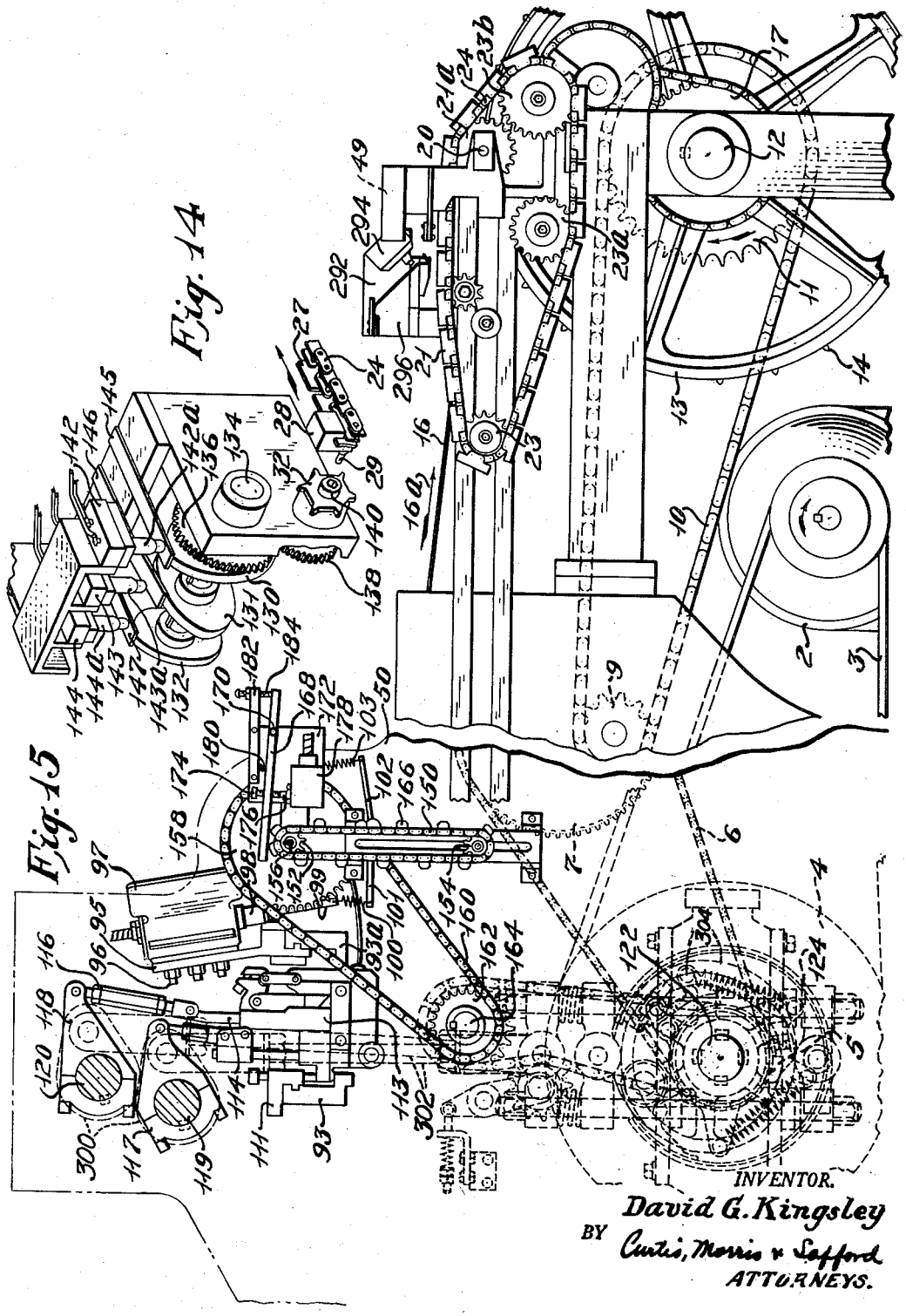
Figure 16:
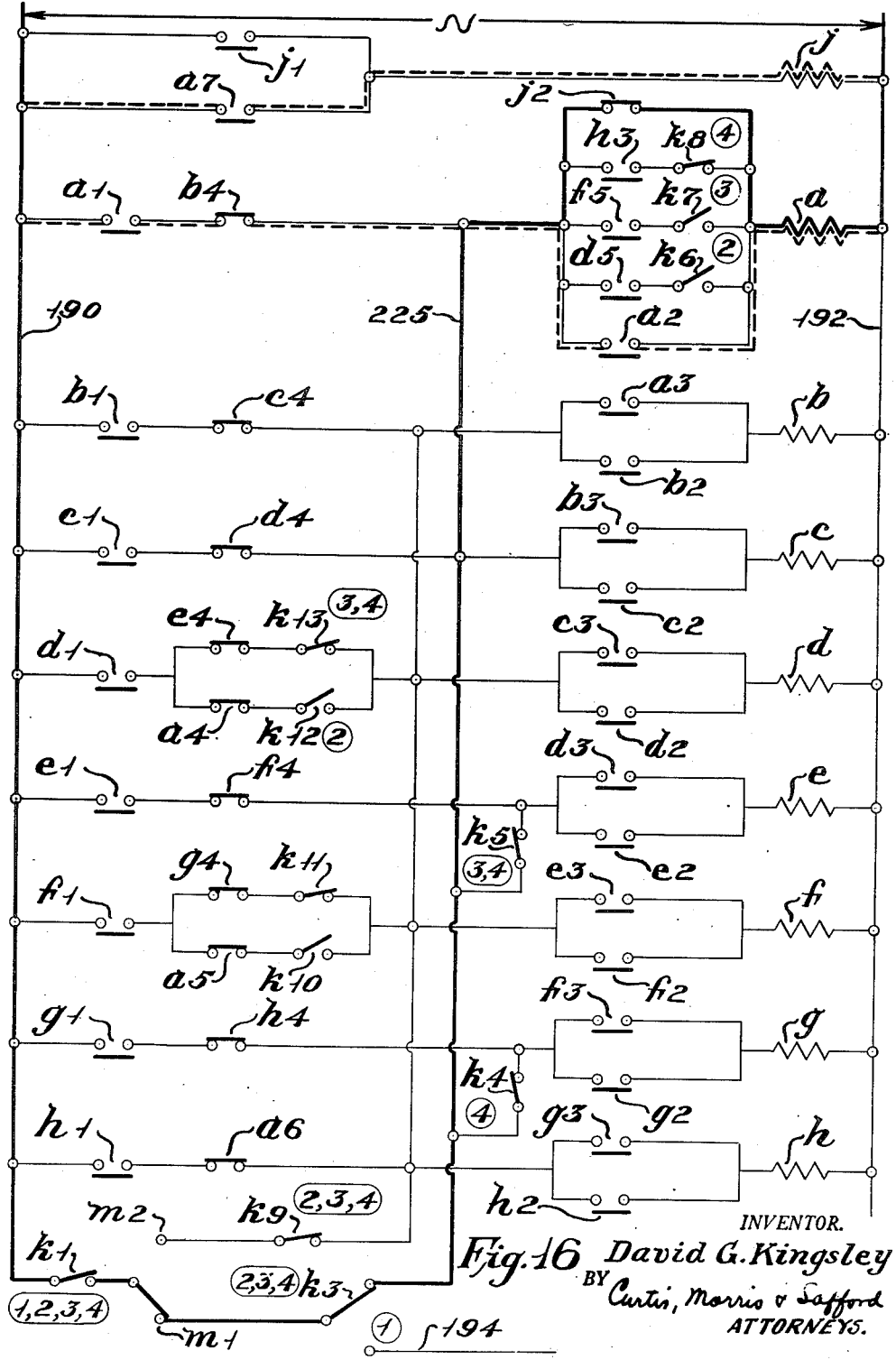
Figure 21:
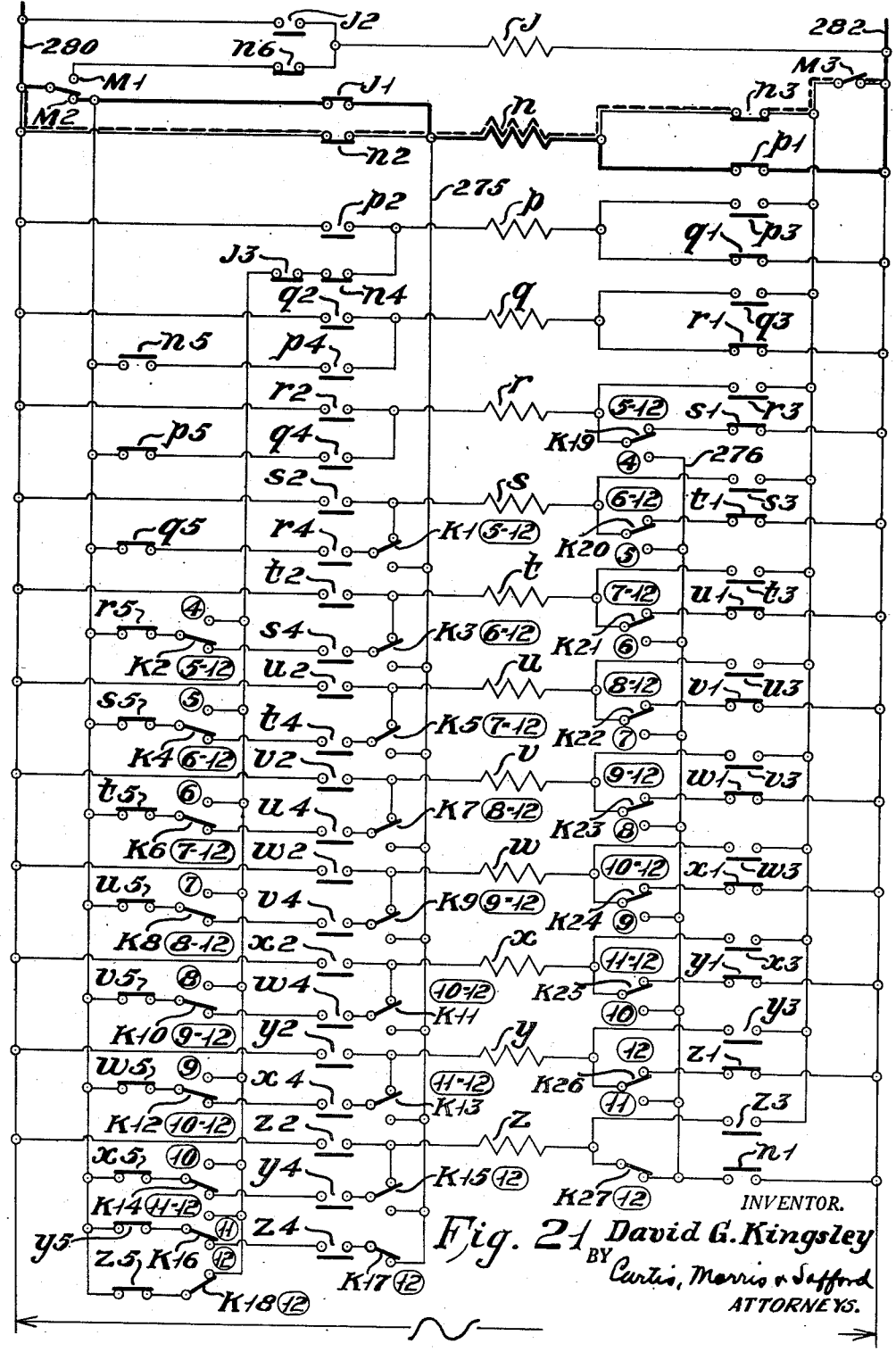
Figure 28:
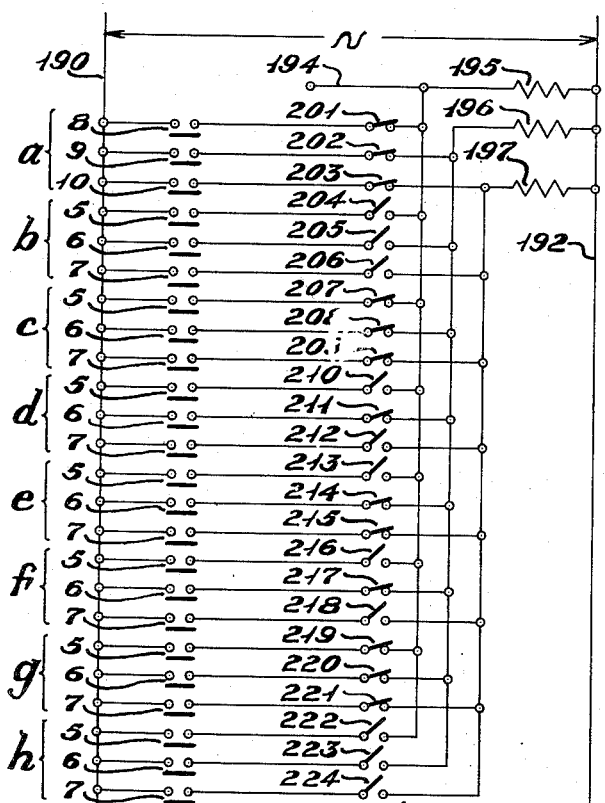
Figure 30:
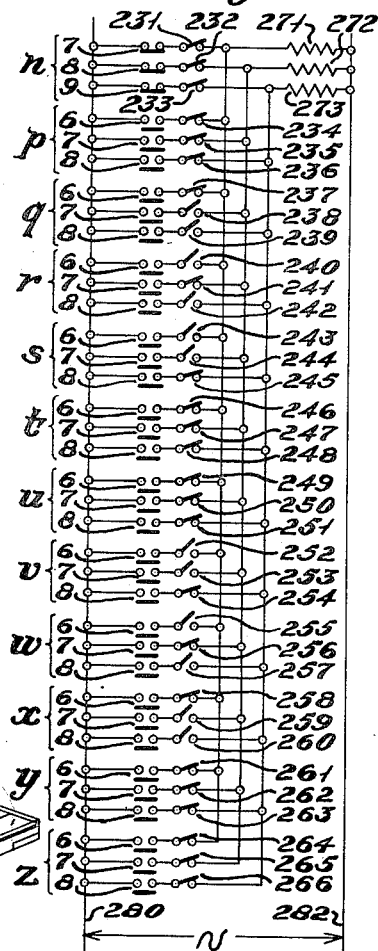
Figure 29:
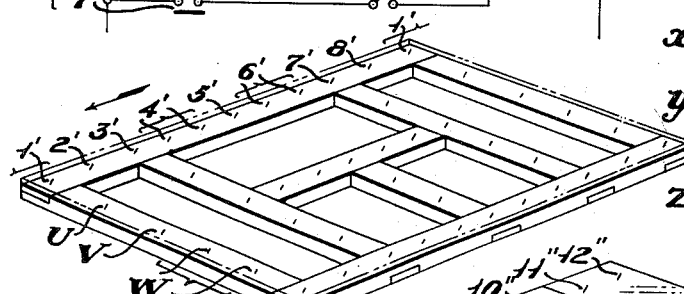
Figure 31:
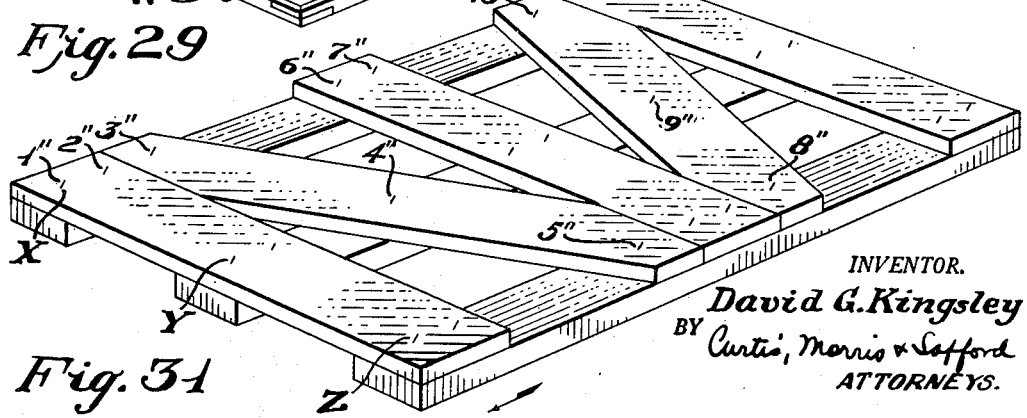

Figure 9, which is an end elevation looking in the direction indicated by the arrows of line 9—9 of Figure 1, shows automatic remote control mechanism which causes the wire-feed-throwout device to function;

Figure 10 is a fragmentary view on a larger scale, taken on line 10—10 of Figure 9, cut away to show a trip member about to engage a sprocket tooth to actuate an electric switch to cause the wire-feed-throwout device to operate;

Figure 11 is a perspective view of a battery of stapler units with their respective wire feed mechanism and also showing air-operated and electrically-operated wire-feed-throwout devices;

Figure 12 is a perspective view of a corrugated panel such as is advantageously made on the machine disclosed. It comprises a framework of cleat members of various lengths, with the shorter transverse brace members spaced apart at unequal distances, necessitating selected stapling operations, which may be accomplished by either of the staple wire-feed-throwout devices or combinations thereof;

Figure 13 is a sectional view taken on line 13—13 of Figure 12, showing a schematic arrangement indicating by full lines the vertical reciprocating motion of the staple forming and driving members of the stapler units and indicating by broken lines the feeding of wire and by intermittent blank spaces the non-feeding of wire accomplished by a staple stock wire-feed-throwout device or combinations thereof;

Figure 14 is a fragmentary perspective view showing an alternative arrangement for remote wire feed control whereby the feed of wire to a plurality of groups of stapling units may be selectively controlled from a single pattern chain;

Figure 15 is a side elevation of a box manufacturing machine including an alternative form of mechanism for remote wire feed control;

Figures 16 and 28 are schematic diagrams of the two portions of a solenoid sequencing circuit for selective control of wire feed to a plurality of groups of stapling units involving the use of a single pattern chain, and wherein changes of the stapling pattern may be accomplished by the resetting of selector switches and the repositioning of actuating elements on the pattern chain;

Figures 17, 18, 19, and 20 are illustrations of the portion of a circuit shown in Figure 16 in successive stages of operation;

Figures 21 and 30 are schematic diagrams of the two portions of an alternative form of solenoid sequencing circuit for remote wire feed control involving the use of a single pattern chain, wherein changes in the stapling pattern may be accomplished merely by the resetting of selector switches;

Figures 22, 23, 24, 25, 26 and 27 illustrate the portion of the circuit in Figure 21 in successive stages of operation;

Figure 29 is a perspective view of a box-part unit or panel stapled under control of the circuit of Figures 16 and 28;

Figure 31 is a perspective view of a crate panel stapled under control of the circuit of Figures 21 and 30; and Figure 32 is a diagrammatic or "phantom" view showing the complete drive trains for the conveyor and pattern chain.

Referring now to Figure 1, this figure shows staple forming and driving units constructed and operated as shown in said Patent 2,304,510, and shows mechanism for controlling the starting and stopping of the staple forming and driving units as fully disclosed in said Patent No. 2,482,370.

In this machine two parallel conveyor belts, one of which is identified by numeral 16, are trained over front and rear sprockets (the rear sprocket is shown at 13). Belt 16 carries spacer elements 47a. These conveyor bands and their spacer elements move continuously and carry to the stapling mechanism prearranged box-part material to be stapled together. The spacer elements are adjustably clamped to the conveyor bands and provide the jigs for the prearrangement of the box-parts. Special spacer elements 47a having lugs 47 are clamped along conveyor band 16, one for each set of box-parts. Lugs 47 function to start a pattern chain that controls the starting and stopping of the stapling mechanism to position the staples along the box-parts as desired. As described in said Patent No. 2,304,510, the spacing between the two parallel conveyor bands is adjustable, and the length of the conveyor bands is also adjustable so that a single box-blank-making machine may be adjusted to make a variety of shapes and kinds of box blanks having different widths, lengths, positions of cleats, cross bracing members, side material, etc.

The stapling mechanism itself comprises a bank of individual stapling units as shown in Figure 11. Each stapling unit comprises a staple-forming mechanism which severs a length from a wire strand fed to the unit and forms it into a staple. Cooperating with the staple-forming unit is a staple-driving unit which drives the staples formed by the forming unit. When the stapling mechanism is started, it continues to drive staples at regular spaced intervals until the stapling mechanism is stopped. The starting and stopping of the stapling mechanism is controlled by the pattern chain mechanism shown at the right end of Figure 1, and the operation of this pattern control mechanism is itself synchronized with the spacer elements carried by conveyer 16 by means of a starting switch 46 shown at the left of Figure 1, which starting switch is operated by the lug 47 of the leading spacer element for each box blank.

As is also described in said Patent No. 2,304,510, the individual stapling units are adjustable laterally across the machine. By loosening the clamps 111 and 112 and rocker arms 117 and 118, a stapling unit and its associated turnbuckle links 115 and 116 may be slid on bars 93 and 93a and rocker shafts 119 and 120. Thus the rows of staples may be transversely positioned as desired. Also any stapling unit or any group of stapling units may thus be moved to an inoperative position at the extreme left-hand side of the machine as viewed in Figure 11, or may be removed from the machine altogether when such stapling units are not needed for the particular box-part being fabricated.

Drive sprockets 13 which drive the conveyor belt 16 are keyed to a drive shaft 12 which during operation is driven by a motor 2 (Figures 1 and 32). This is accomplished by connecting motor 2 through drive belt 3 with drive pulley 4 which, through associated hub sprocket 5, drives chain 6 and sprocket 7 which houses a clutch 348 which is adapted to mechanically connect sprocket 7 with shaft 8. When sprocket 7 is clutched to shaft 8, rotation of shaft 8 through change gears 350, 352, 354, 356 and shaft 358 drives sprocket 9, chain 10 and sprocket 11 keyed to drive shaft 12. Rotation of conveyor drive sprocket 13 drives conveyor belts 16 in the direction shown by arrows 16a. Outwardly projecting studs 14 on drive sprocket 13 engage holes 15 in the conveyor bands to maintain positive position relationship with respect to such bands and also to maintain the bands trained about the sprockets.

Since left conveyor band 16 performs the function of starting the staple pattern control mechanism, only left conveyor band 16 is shown and referred to. The staple pattern control mechanism itself is fully described in the above-identified U. S. Patent 2,482,370, and it is not necessary herein to describe its parts and operation in detail. It has an endless chain of substantially the same length as that of the part being fabricated by the machine. The chain has switch-operating pins spaced along the chain at points where it is necessary to start the stapling operation and at points where it is necessary to stop the operation. The chain itself is driven through a clutch by rotation of drive shaft 12 driving conveyor band 16. The drive is such that the speed of the pattern chain is identical with that of the conveyor band. The rotation of the pattern chain is synchronized with the movement of conveyor bands 16 and with the spacer elements carried thereby by means of the previously mentioned switch 46 which is tripped by lug 47 each time a leading spacer element 47a placed at the front end of a box unit to be fabricated passes arm 46a extending from switch 46. The pattern chain is stopped and positioned ready for starting by a stopping pin carried by the chain, which pin operates a switch that de-energizes the clutch driving the pattern chain and simultaneously applies a magnetic brake positively to stop the pattern chain in its starting position.

Referring again to Figure 1 and also to Figures 9, 10 and 32, power is communicated to the pattern chain by drive shaft 12, a sprocket 310 (Figure 32), chain 312, sprocket 314, rotatable shaft 316, sprocket 318, chain 320 and through sprocket 18 (Figure 9) rotatably mounted on stationary shaft 20. Sprocket 18 is part of a magnetic clutch 19 rotatably mounted on stationary shaft 20. A drive sprocket 21a is rotatably mounted on shaft 20 between magnetic clutch 19 and a fixed magnetic brake 22 secured to stationary shaft 20. When clutch 19 is energized, sprocket 18 drives sprocket 21a which functions as an armature plate. When magnetic brake 22 is energized, it positively stops drive sprocket 21a. Chain 24 (Figure 1) is trained about drive sprocket 21a, a tension adjusting sprocket 23, and sprockets 23a and 23b. Chain 24 carries side walls 21 which function as a pattern holder. Adjustably secured thereon are lugs 25 carrying switch-operating pins 26.

Movement of chain 24 carries pins 26 beneath turnstile 48, and each time a pin passes under the turnstile, it rotates the turnstile through one-sixth of a rotation. Secured to turnstile 48 is a cam 48a having three low points spaced equidistant therearound, and three high points spaced equidistant between the three low points. As pins 26 rotate the turnstile and rotate the cam, the movement of the cam presents a low point in place of a high point, or a high point in place of a low point, and thereby operates a switch 49 which, through suitable electrical circuits and mechanical mechanism, starts and stops the drive of the stapling mechanism as described in the above-mentioned Patent No. 2,482,370. Switch 49 has a plunger 49a which is reciprocated by a flat spring member 48b which rides on the cam 48a. Elements 32 and 38, identical with that of switch 49 and cam 48a, will be described in greater detail in connection with the pattern control of the staple feed throwout mechanism.

As shown through a cutaway portion 45 at the left in Figure 1, start switch 46, for energizing clutch 19, is secured at a convenient point on the machine near the stapling units and adjacent the inner side of left conveyor band 16 which has clamped thereto at predetermined points, associated with the leading edge of a box part to be stapled, the trip lugs 47. When lugs 47 actuate start switch 46, it energizes magnetic clutch 19 to drive the pattern chain 24 in the direction indicated by arrows in Figures 1 and 10.

The pattern chain 24 carries an upstanding lug 290 (Figure 10) adapted to cooperate with a downwardly extending spring finger 292 (see also Figure 1) to cause actuation of a switch 294 mounted above the pattern chain assembly on a bracket 296. This switch 294 is connected to the magnetic clutch 19 in the drive of pattern chain 24 so that actuation of switch 294 by lug 290 causes disengagement of clutch 19 to stop the pattern chain 24. It will thus be seen that the pattern chain 24 is started in movement by actuation of switch 46 simultaneously with the arrival at the stapling mechanism of the leading edge of each box part to be stapled, and is stopped by actuation of switch 294 after one complete revolution of the pattern chain, and remains in fixed position until the arrival of the next box part.

A stapling unit is shown in Figures 1, 2 and 6. Referring to Figure 6, each stapling unit is supported by brackets 111 and 112 on cross bars 93 and 93a which extend between side frame members 50 (Figure 11). Each stapling unit includes a staple former 113, a driver 114 that operates inside the staple former, and mechanism for operating the driver and former. The staple former is reciprocated by a link 115 secured to rocker arm 117 attached by a suitable key to rocker shaft 119 that extends between the side frame plates 50. Driver 114 is reciprocated by a turnbuckle link 116 secured to rocker arm 118 supported by rocker shaft 120 which also extends between plates 50. The two rocker shafts 119 and 120 are driven by means of crank arms 300 (Figure 15) and connecting rods 302 from cams 304 secured on the main drive shaft 122. The pulley 4 and its associated sprocket 5 on the drive shaft 122 are normally freely rotatable with respect to the drive shaft. A clutch 124 (see also Figure 15) is provided for engaging the pulley 4 with the drive shaft so that the motor 2 will drive the drive shaft 122 and cams 304 to cause periodic motion of rocker shafts 119 and 120 and actuation of the stapling units. The clutch 124 is operated by a solenoid under control of switch 49 (Figure 9). When this switch is closed, clutch 124 is engaged and the drive mechanism above described continuously oscillates rocker shafts 119 and 120 to operate the staple former and staple driver to form and drive staples at regular intervals in work passing beneath the stapling mechanism.

Each stapling mechanism and its associated parts are adjustable along cross bars 93 and 93a and along rocker shafts 119 and 120 properly to position the respective stapling units for the lateral driving of staples simultaneously across box parts moving beneath the stapling mechanism. But because of pattern chain 24 and its associated parts, the stapling units are started and stopped to irregularly space the staples lengthwise as desired.

As shown in Figure 1, and in greater detail in Figures 6, 7 and 8, associated with each stapling unit is staple stock wire feed mechanism which, as described in the above-mentioned Rosenmund Patent 2,304,510, normally acts to feed staple wire to its stapling unit as long as said unit is operating, at a rate controlled to give the desired length of staple. Mechanism associated with the staple former periodically cuts off a length of the staple stock wire fed to the staple former. The staple wire is identified by numeral 121.

The staple wire feed units as shown in Figures 6, 7, 8 and 11, are mounted on a drive shaft 69 extending between side plates 50. And each unit has a body member 73 suitably bolted by bolts 91 to the bracket 112 of the stapling unit to which the feed unit feeds its staple wire. Each wire feed unit has a drive gear 70 keyed to shaft 69 and adjustable along shaft 69 to provide for the aforesaid lateral adjustment of the individual stapling units. Each unit also carries a smaller gear 71 mounted on a short shaft 72 journaled in the body member 73. Secured to the other end of the shaft 72 and adjacent the side face of body member 73 is a knurled feed roll 74.

Referring to Figures 5 and 8, associated with each feed roller is a knurled tension roller 75, which by holding staple wire stock 121 tightly against knurled feed roller 74 causes roller 74 to feed the staple stock wire forwardly through flexible tubing 121a into a receiving passage provided within the stapling unit. The wire feed drive shaft 69 is coupled to the motor 2 through gears 330 and 332 (Figure 32), shaft 334, sprocket 336, chain 338, sprocket 340, shaft 342, sprocket 346, chain 344 and sprocket 347 on the stapler drive shaft 122, which is connected to the motor 2 through the clutch 124 as above described; thus the drive shaft 69 is rotated to feed wire to the stapling units only when the clutch 124 is engaged to drive the stapling units.

In accordance with the present invention, the operation of knurled roller 74 and tension roller 75 is such that the feed of stapling wire 121 by these rollers may be instantly discontinued or continued in accordance with a predetermined pattern, such for example as that which may be set up on pattern chain 24 shown in Figure 1. In the present embodiment the discontinuing of the feed and the continuation of the feed of wire 121 is accomplished by moving tension roller 75 away from or toward roller 74. Roller 75 is eccentrically mounted on a shaft 76 (Figure 4) rotatably mounted in a bracket 77 secured by headed screws 79 to member 73. The screws pass through elongated slots in an upwardly projecting arm 78 of bracket 77. Tension roller 75 is held on shaft 76 by a suitable headed screw 82 threaded into the shaft.

Tension roller 75 is moved toward and away from knurled feed roller 74 by turning shaft 76. To this end shaft 76 projects through bracket 77 and has secured to its other end a slotted head 80 (Figure 2). Arm 84 is secured to head 80 and extends rearwardly. Arm 81 also secured to head 80, extends forwardly. Thus, upward movement of arm 81 by power operated mechanism, to be described, rotates shaft 76 to move tension roller 75 away from roller 74, and upward movement of arm 84 moves the tension roller toward feed roller 74.

As shown in Figure 4, arm 84 has its free end connected to a tension spring 83 hooked at one end to the free end of arm 84, and at its other end to a hole in screw 85 adjustably threaded through lug 86 secured to the upper left hand portion of body member 73. Screw 85 is adjustable to provide for adjusting the tension exerted by spring 83 in holding roller 75 in wire feeding position, when operating arm 81 is released.

From the foregoing it is evident that it is upward movement of arms 81 which rotates eccentrics 76 against the action of springs 83 and moves the tension rollers 75 away from staple wire stock feeding position to discontinue the wire feeds to the stapling units and effect staple throwout.

The present invention provides mechanism for operating individual arms 81, or selected groups of arms 81, to accomplish the staple throwout in accordance with a predetermined pattern set up on the pattern chain 24. One form of mechanism for moving a selected group of arms 81 will now be described. Figures 1, 2 and 3 show an air-operated motor comprising a cylinder 42 containing a piston. Air supplied through hose 43 and exhausted through hose 44 drives the piston down to release arm 81 so that springs 83 are free to hold tension rollers 75 in the staple wire stock feeding position.

Air cylinder 42 is, as shown in Figure 11, approximately mid-way between the two side plates 50. Its upper end is supported on a split clamp 51 clamped to transverse tubular brace 54 (Figure 11) extending between side plates 50. Screw 56 holds clamp 51 to the brace member 54. Air cylinder 42 is pivoted to clamp 51 by a pin 53 passing through holes in yoke 52 extending from the air cylinder and through a hole in the clamp (Figure 2).

The piston at its lower end carries a turnbuckle 62 threaded into block 57 encircling a rocking bar 58. Bar 58 is supported at either end by levers 59 pivotally supported on studs 61 projecting inwardly from side frames 50.

Referring to Figure 11, the arms 81 of the stapling units that are to be subject to the staple throwout control mechanism rest upon bar 58. In the particular arrangement illustrated in Figure 11, all except one of the ten intermediate stapling units Y are provided with arms 81 positioned for actuation by the bar 58. The two outside stapling units X are customarily not under wire feed control since most forms of box parts or panels have cleats running the full length of either side and it is desirable that the outside staple units drive staples along the full length of these cleats—in other words, that each of these units drives a staple for each cycle of operation of its staple former and driver. Any one or more of the stapling units may be controlled from bar 58. Also, additional bars 58 may be added with their respective air cylinders so that different groups of stapling units may be thrown in or out of operation independently of other groups.

As above mentioned, air pressure applied to the cylinder 42 causes its piston to move downwardly or upwardly as shown in Figure 11. Supply of air pressure to the cylinder and the exhausting of air pressure from the cylinder is rapid so that the operation of the piston in the cylinder is rapid with negligible time lapse occurring after the signal is received to continue or discontinue the staple feed.

To this end a suitable air supply line 41 connected with a supply chamber 41a supplies air to an electro-magnetically-operated air valve 40 of conventional design (Figure 2). When the solenoid of the magnetic air valve is energized, it connects pipe 43 with the source of air supply in chamber 41a and simultaneously connects pipe 44 with the atmosphere thus moving the piston down, causing wheel 75 to engage wire 121 to feed the wire to the stapler. When the solenoid of the valve is de-energized, valve 40 automatically connects pipe 44 with the source of air supply and pipe 43 with the atmosphere raising the piston, and stopping the wire feed. In this way the piston in the cylinder 42 is positively moved in both directions.

Referring to Figures 3 and 11, rocking bar 58 is urged upwardly by two springs 65 whose upper ends are secured to brace member 54 by suitable shank clips 66 and whose lower ends are hooked to the rocking bar by suitable shank clips 67 which engage flange collars 68 fixed to the rocking bar.

Springs 65 effectively counteract the force of springs 83 so that the load placed on the piston in cylinder 42 is approximately the same whether the piston is moving up to discontinue the staple feed or is moving down to continue the staple wire feed. This insures the same speed of operation of the piston in both directions.

As above-mentioned, magnetic air valve 40 is controlled in accordance with a time pattern synchronized with the movement of box-parts past the stapling machine. In the present embodiment this is accomplished in a manner similar to that described in the above-mentioned U. S. Patent No. 2,482,370. The magnetic valve 40 is controlled by the same pattern chain 24 that controls the starting and stopping of the stapling mechanism itself. To this end (referring to Figure 9) chain 24 carries a pattern holder in the form of side walls 27 opposite side walls 21. As described in connection with side walls 21, side walls 27 carry adjustable activating elements 28 to which are secured trip pins 29. Referring to Figure 10, the trip pins operate a turnstile and switch similar to that described in connection with the side walls 21 and shown in Figure 9. Thus, the switching mechanism comprises a stud 30 threaded into an upwardly projecting extension from bracket 31. Rotatable on stud 30 is turnstile 32 carrying a cam 33 provided with low points 34 and high points 35 spaced equidistant around the cam. Resting on the cam is a flat spring finger 36 secured at 37 whose free end is raised and lowered by the cams to operate an electric switch 38 by reciprocating spring-pressed plunger 39. Spring 36 also acts as a detent properly to align the high and low spots of the cam so that switch 38 is either held open or closed by the cam. Each time trip pin 29 passes turnstile 32 it rotates the turnstile through one-sixth of an operation, and if spring 36 is resting on a low point, the rotation moves a high point beneath spring 36, and if spring 36 is resting on a high point, the one-sixth rotation moves a low point beneath the spring.

Movement of plunger 39 upwardly energizes magnetic air valve 40 to supply air to air hose 43 to move the piston in air cylinder 42 downwardly, and vice versa.

The movement of chain 24 is synchronized with the movement of box-parts past the stapling mechanism, and by positioning pins 29 along the pattern chain the staple wire feed may be interrupted whenever it is desired to throw out staples or started whenever it is desired to drive staples without affecting the operation of the stapling units themselves.

Referring to Figure 12, there is shown a corrugated panel which is representative of the type of box unit that requires staple throwout. Assuming for the moment that the framework comprises two longitudinal side members 87, two end transverse members 88, and an intermediate transverse member 89 (and that intermediate longitudinal member G is omitted), it is noted that eight staples in row $S^1$ are required for stapling the frame members and the corrugated paper 87a together. This requires a battery of eight stapling units. The outside stapling units which drive the staples into the longitudinal side members 87 require no staple throwout, but the staple wire feed to the six intermediate stapling units must be thrown out in such manner that they drive no staples for rows $S^2$, $S^3$, $S^5$, or $S^6$, but do drive staples for rows $S^4$, and $S^7$ along the transverse members 89 and 88. Thus, it can be assumed that eight stapling units are set up with the two outside stapling units X not under control of the staple wire throwout; but with the intermediate stapling units Y under control of the staple throwout mechanism.

It is also noted that the transverse member 89 is so positioned with respect to the frame that it is not practical to have equal spaces between the rows of staples $S^1$—$S^7$. That is, if the stapling units were to run continuously, staple row $S^4$ would not land in the proper position on transverse member 89. Thus, in practice, after staple row $S^1$ is driven, a pin 26 on the pattern chain would stop the stapling mechanism for a sufficient length of time so that when it started again the normal cyclical operation of the stapling mechanism would place the staple row $S^4$ on cross piece 89. This requires irregular spacing of pin 26 along the pattern chain.

With this assumption, the stapling mechanism will operate as follows to make the panel. When the conveyors 16 are set in motion to carry assembled parts to the stapling mechanism as the lug 47 clamped to the left conveyor band 16 (Figure 1) and associated with the leading end E of the moving work reaches start switch 46, the switch energizes magnetic clutch 19, and pattern chain 24 immediately starts. The first pin 26 on side wall 21 actuates switch 49 to set in motion the stapling mechanism, and the whole row of staples $S^1$ (Figure 12) will be driven (the staple wire throwout mechanism having previously been operated to leave staple wire in the staple former). But as soon as the row $S^1$ is driven, a pin 26 stops the stapling mechanism. The stapling mechanism is started again by another pin 26 to drive rows $S^2$, $S^3$, and $S^4$, and the pin is positioned to bring row $S^4$ on cross piece 89. But at the time the rows of staples $S^2$ and $S^3$ are driven, the intermediate stapling units do not drive any staples, because a pin 29 on the pattern chain had previously stopped the wire feed with the result that there was no staple wire in the staple formers at the time the rows $S^2$ and $S^3$ were driven.

Since the row of staples $S^4$ requires driving of the entire eight staples, a pin 29 carried by the pattern holder operates to start the wire feed to supply the staple formers with staple wire for the staple driving operations for row $S^4$.

After row $S^4$ is driven, a pin 26 stops the stapling mechanism until continuous operation brings row $S^7$ on end piece 88, as described in connection with rows $S^1$, $S^2$, $S^3$, and $S^4$.

No staple wire is supplied to the intermediate stapling units for rows $S^5$ and $S^6$, but wire is supplied for row $S^7$ and for the following row $S^1$ in the next panel. It is noted that a pin on chain 24 stops the stapling mechanism after row $S^7$, and another pin stops the chain itself. Not until the lug 47 associated with the leading end F of the succeeding panel operates switch 46 does the pattern chain start again on its cycle of operation.

The starting and stopping of the staple wire feed as above described is controlled by pins 29 on chain 24. But as will appear, the starting and stopping of the wire feed is timed with the driving of the preceding row of staples.

It is noted that so long as the stapling units are in operation, knurled feed rollers 74 turn at a constant speed, and that so long as the tension rollers 75 are holding the staple stock wires against feed rollers 74, staple wire is continuously fed to the stapling units. This continuous operation of the feed rollers in combination with the discontinuance of the staple wire feed by moving the tension roller away has advantages. The staple wire feed may be started and stopped, but at the same time, when a staple is desired the combination insures that the correct lengths of staple wire will always be cut from the stock and that the staples driven will be of uniform length.

Turning now to the timing of the stopping and starting of the staple wire stock: since the wire length which is formed into a staple and driven in a given staple driving operation is cut from the staple wire stock fed during the next preceding staple driving operation, it is necessary to stop the feed of the staple stock one cycle ahead of the cycle in which no staple is to be driven. Likewise, after the wire feed has been stopped, it is necessary to start the feed one cycle ahead of the cycle in which the staple is to be driven.

In Figure 13 there is shown the timing of the mechanisms by which the foregoing stapling operations are performed for the panel of Figure 12. In the lower part of Figure 13 is shown a section through the panel of Figure 12. Above this section is a broken line which shows schematically the intervals of time during which the staple stock wire is fed to the intermediate stapling units Y. The solid line represents schematically the operation of the stapling mechanism. Section A represents the trailing end A of the leading panel in Figure 12; Section B the middle panel, and Section C the leading end of the following panel F. Since the row of staples $S^5$ and $S^6$ of Section A include only the outer staples, the staple feed control mechanism has been operated to prevent the driving of the intermediate staples in these rows. But the row of staples $S^7$ is complete, and therefore the staple wire feed is started during the cycle driving row $S^6$. To this end a pin 29 on the pattern chain operates turnstile 33 and switch 38 to cause the magnetic air valve to supply air to cylinder 42 to drop bar 58 to start the wire feed at the end of the upstroke of the stapling operation that drove row $S^5$. That is, pin 29 is adjusted to start just before the completion of the upstroke of the stapling unit.

As shown in Figure 13, the wire feed started at the point D. On the next down stroke of the stapling unit, a small portion of wire $D^1$ is cut off at $D^2$ by the staple former, and is spit out during the driving of the row $S^6$ and falls loosely and harmlessly upon the box part being worked upon or through the machine to the floor below. But the staple wire feed continues during the $S^6$ cycle, i. e., during the interval $D^2$—$D^3$. At $D^3$ the staple former severs the wire, and the length fed during the interval $D^2$—$D^3$ is formed into the staple driven in the row $S^7$.

It would be possible to start the wire feed at the point $D^2$, which is the point of cut-off by the staple former, providing the mechanical adjustments of the stapling mechanism and of the staple feed mechanism were precisely accurate. But to avoid the need of such precision adjustment, it is preferable to start the staple wire feed ahead of the point $D^2$ to insure a full length being fed for the formation of the staples in the row $S^7$. Otherwise, it is possible that the wire might start after the point $D^2$, in which event the staples driven in row $S^7$ would not be the full length.

One of the advantages of employing a continuously operating wire feed roll is that the feed may be started ahead of time, and a full length of staple insured. In practice the starting pin 29 is advantageously positioned so that the length of wire fed during the interval is one-sixteenth of an inch long for normal operation. But because of variations in the operation of the machine, this length varies plus or minus one-sixteenth of an inch. Thus, over a period of time, the length $D^1$ may vary between zero and one-eighth of an inch. Since staples are to be driven across row $S^1$ of the following panel, the feed mechanism remains in feeding operation for row $S^7$ but, of course, since the stapling units and feed rollers stop during the interval between row $S^7$ and $S^1$, no wire is fed during this time. At the point $D^4$ the staple former cuts off the wire, and the length fed during the interval $D^3$—$D^4$ is driven in row $S^1$. But because no intermediate staples are driven in row $S^2$, the staple stock feed is stopped at point $D^5$. This is accomplished by a stopping pin 29 operating switch 38 to cause cylinder 42 to raise bar 58. The short additional length fed during the interval $D^4$—$D^5$ is cut off and spit out during the driving of row $S^2$. As with the starting of the feed, it would be possible to stop the feed at the cut-off point $D^4$, but unless the parts were precisely adjusted the wire feed might stop before the cut-off point, in which case short staples would be driven in row $S^1$.

In practice, the pin 29 stopping the wire feed at point $D^5$ is adjusted to stop the feed to allow a length $D^4$—$D^5$ of one-sixteenth of an inch. But since in normal operation this length varies plus or minus one-sixteenth of an inch, the actual lengths $D^4$—$D^5$ may vary from zero to one-eighth of an inch.

Referring to Figures 6, 7 and 8, there is shown another embodiment of the invention in which the staple throwout mechanism is operated by a conventional solenoid 97. As shown, solenoid 97 is secured by bolts 96 to a tongue 95 extending up from a bracket 92 secured by clamping block 94 to cross bar 93a. A solenoid plunger 98 has a rod 99 secured thereto. The lower end of rod 99 is attached to a spring 100, itself attached to the free end of an arm 101 similar to arm 81 of Figure 11. Arm 101 is threaded into the side of a head 90 of shaft 76, on which is eccentrically mounted a tension roller 75. Thus, reciprocation of rod 99, oscillates arm 101 and shaft 76 to move tension roller 75 into and out of engagement with the staple wire stock.

Extending from the other side of head 90 is arm 102 (corresponding to arm 81 of Figure 11), to the free end of which is secured a spring 103 anchored at its upper end to an adjustable screw 104 supported from bracket 105 clamped to adjustable block 77 by the bolts 106. Spring 103 urges shaft 76 to release knurled roller 75, and when the solenoid is de-energized, spring 103 holds knurled roller 75 away from driving engagement. But when switch 38 is actuated to energize the solenoid, its plunger 98 pulls on rod 99 and on arm 101, and turns shaft 76 to move tension roller 75 into feeding engagement. The other parts of the staple wire feed mechanism are like those described in connection with Figure 4.

Solenoid 97 may be connected to the switch 38 (Figure 9) for control thereby in accordance with the pattern of the operating parts 28 on the pattern chain 24. Where the desired stapling pattern requires that a number of stapling units be simultaneously controlled, each may be arranged for operation by a separate solenoid 97, with all the solenoids 97 connected in a parallel electrical circuit for simultaneous control by the single switch 38. Alternatively, a single solenoid, similar to the solenoid 97 but of larger power rating, may replace the pneumatic cylinder 42 and its associated solenoid valve 40 (Figures 1 and 2) and be connected in like manner to control a plurality of wire feed control units by means of the cross bar 58.

Many box-part units, such as the panel illustrated in Figure 12, require selective control of several stapling units or groups of stapling units. It will be understood from an inspection of the panel of Figure 12 that the row of staples in the longitudinal cleat G must be made by a stapling unit under different control than are the stapling units which drive all of the other intermediate rows of staples in the panel. As previously mentioned in connection with the machine shown in Figure 11, the operating arms 81 of all of the intermediate stapling units Y rest upon the transverse bar 58 with the exception of the fourth unit from the right, the actuating arm 102 of which is connected to a solenoid 97 of the type shown in Figures 6, 7 and 8. The wire feed to this stapling unit may thus be under different control than the other intermediate stapling units. Such selective control of two or more stapling units or groups of stapling units may be achieved by providing additional switches such as the switch 38 which may be controlled in like manner by adjustably positioned operating parts such as the operating parts 28. These may be mounted either upon additional side walls on the pattern chain 24 or upon a separate and complete new pattern chain assembly. In other words, in this embodiment of the invention, for each separately controlled solenoid, corresponding switches and switch actuating mechanism must be added.

Figure 14 illustrates an alternative apparatus for achieving selective control of several groups of stapling units from a single pattern chain. This embodiment of the invention makes use of the indexing apparatus illustrated in Figure 9, in which, it will be recalled, a turnstile 32 is intermittently driven through fractional revolutions by actuating elements 28 on one of the side walls 27 of the pattern chain 24. However, in lieu of the single cam 33 coupled to the turnstile in the apparatus of Figure 9, a plurality of cams 130, 131 and 132 (Figure 14) are used. These cams are mounted on a shaft 134 upon which is also fixed a spur gear 136 which meshes with another spur gear 138 on the shaft 140 upon which the turnstile 32 is secured. Thus, each time the turnstile is engaged and moved by one of the actuating elements 28 on the pattern chain 24, the cams 130, 131, and 132 are indexed through a fractional revolution.

Arranged above the cams for actuation thereby are three switches 142, 143 and 144, which have downwardly projecting actuating plungers 142a, 143a and 144a, respectively, each of which is arranged to cooperate with the surface of one of the cams through the medium of one of the leaf springs 145, 146 and 147.

Each of the switches 142, 143 and 144 is connected to one of the solenoids 97 (Figure 6), or to a group of such solenoids connected in parallel, to control the feed of wire to the associated stapling unit or group of stapling units. The pattern chain 24 is, as above described, provided with an actuating element 28 at each position corresponding to the position of a change in the desired stapling pattern. That is to say, where the pattern of staples in the box-part unit remains unchanged through several cycles of operation of the stapling units, the cams 130, 131 and 132 may be stationary, so that no actuating elements need be provided on the pattern chain for the cycles of operation in which the pattern is repeated.

Since the turnstile shown is adapted to be indexed one-sixth of a revolution each time it is engaged by one of the actuating elements 28, and since the ratio of the illustrated gears 136 and 138 is 1:1, the cams 130, 131 and 132 are shaped to provide six rotational stations, thereby allowing six changes in the stapling pattern for each revolution of the cams; advantageously, the cams make one revolution for each box-part unit fed through the machine. Different gear ratios may be used to increase or decrease the number of pattern changes per box-part unit.

The pattern of staples in the box-part units is thus determined by the number and placement of the actuating elements 28 on the pattern chain, the ratio of the gears 136 and 138, and the shape and relative orientation of the cams 130, 131 and 132. Since all these factors are variable, a great diversity of stapling patterns is possible.

In Figure 15 is shown an alternative arrangement for selectively controlling one or more groups of stapling units, but wherein an actuating element is provided for each cycle of operation of the stapling units in which a staple is to be driven (or in which a staple is to be omitted, depending upon the switch arrangement). In the particular apparatus illustrated, a single pattern chain 150 is shown, trained upon a drive sprocket 152 and an idler sprocket 154. The drive sprocket 152 is driven through a shaft 156, a sprocket 158, a chain 160, another sprocket 162, and a shaft 164. This latter shaft 164 is coupled to the shaft 122 which drives the stapling units, so that the pattern chain 150 is driven whenever the stapling units are driven. The dimensions of the chain 150 and its drive ratio are such that two links of the chain 150 pass a given point in the rotation of the chain for each stapling cycle.

A plurality of actuating elements 166 are provided, each having clips adapted to engage the rollers of the chain 150 and secure the actuating elements in position on the chain. The size of each of the actuating elements is such that it occupies a lengthwise dimension on the chain equivalent to two links.

Arranged to cooperate with the actuating elements 166 is a switch arm 168 which is pivotally mounted at 170 on a bracket 172 extending from the frame of the machine. The switch arm 168 bears an adjustable actuating screw 174 arranged to cooperate with the plunger 176 of a switch 178 also mounted upon the bracket 172. The arm 168 is urged in a counter-clockwise direction (as viewed in Figure 15) about its pivot 170, by means of a spring 180 compressed between the arm 168 and a bar 182 thereabove. This counter-clockwise bias of arm 168 applies pressure on plunger 176 through screw 174 to keep plunger 176 normally depressed. This counter-clockwise travel of arm 168 is limited by a set screw 184 mounted on the bar 182 and arranged to engage the right-hand end of arm 168 and restrict upward movement thereof. When one of the actuating elements 166 of chain 150 moves beneath the arm 168, however, it moves the arm in a clockwise direction against the force of spring 180, thereby lifting screw 174 from plunger 176 and actuating switch 178.

Switch 178 may, for example, be a normally closed switch, and may be connected directly to operate one or more of the wire feed solenoids 97 (Figure 6). With such an arrangement, the staple wire feed units controlled by said solenoids will be normally ineffective to feed wire to the associated stapling units; however, each time one of the actuating elements 166 engages the arm 168 to throw the switch 178 and energize the solenoid, the staple wire feed units are rendered effective to feed wire. The dimensions of the actuating elements 166 are such that the passage of each actuating element under the arm 168 will hold the switch 178 closed for such time that sufficient wire for one staple will be fed to each of the stapling units under control. Also, as may be seen in Figure 15, when two actuating elements 166 are placed adjacent to each other on the chain 150, i. e. on adjacent pairs of links, the arm 168 is held upwardly from the time the first of the two actuating elements reaches the arm until the second actuating element has cleared the arm. Thus, the wire feed units under control are driven continuously through two cycles of the machine and feed to the associated stapling units sufficient wire to form two staples.

The desired pattern of staples in a box-part unit may accordingly be changed by merely changing the positions of the actuating elements 166 on the pattern chain 150. It will also be appreciated that several groups of stapling units may be selectively controlled by providing two or more pattern chains 150, each with its own switch 178 and associated actuating mechanism.

In Figures 16 and 28 is illustrated an alternative form of apparatus for selectively controlling several groups of stapling units with a single pattern chain, and in which changes in the stapling pattern may be achieved without substitution of cams by the mere resetting of switches. This apparatus comprises a solenoid sequencing circuit including a plurality of solenoids arranged to be energized in sequence to connect successive banks of pattern selector switches to the wire feed solenoids, the pattern of staples during the time each bank of selector switches is thus connected depending upon the setting of the switches in that bank.

As shown in Figure 16, the circuit includes eight sequencing relays, a through h. For clarity, the contacts associated with each relay have been given reference designations which include the reference letters identifying the relay; for example, the contacts associated with the relay $a$ are designated $a^1$, $a^2$, etc. In order to avoid undue reduction in size of the drawings, the circuit has been divided into two portions, Figures 16 and 28. The two conductors 190 and 192 at the left- and right-hand extremities, respectively, of the two figures are common to both portions of the circuit, and are connected, as indicated, to the respective terminals of a source of electrical power. The conductor 194 shown broken at the lower center of Figure 16 and at the upper center of Figure 28 is the same.

The portion of the circuit in Figure 28 includes three wire feed control solenoids 195, 196 and 197, each of which is arranged, like the solenoid 97 in Figure 6, to control the feed of wire to one or more stapling units. As shown, one terminal of each of these wire feed solenoids 195, 196 and 197 is connected through the conductor 192 to one terminal of the source of electrical power. The other terminal of each solenoid is connected to the opposite terminal of the source of power through one of three manually operable switches in each of eight banks of switches 201—224, and through one of the normally open contacts of each of the eight sequencing relays $a$—$h$. Thus, during the time each of the sequencing relays $a$—$h$ is energized, it renders the three selector switches of one of the eight banks of switches effective to control the three wire feed solenoids 195, 196 and 197. If a selector switch thus connected has been manually present in closed position, its wire feed solenoid is energized and renders one or more wire feed mechanisms effective to feed wire to the associated stapling units.

In Figure 28, the selector switches are shown as properly set for making the box-part unit or panel illustrated in Figure 29. This panel is fed through the box-part machine in the direction indicated by the arrow. The panel has six longitudinal rows of staples and accordingly requires six laterally spaced stapling units.

The pattern of staples in the panel of Figure 29 is such that the two outside stapling units drive staples every stapling cycle and accordingly need not be under wire feed pattern control. The two rows of staples indicated by the letter W are identical and the wire feed mechanism of the two stapling units which make these rows may either be controlled by the same wire feed solenoid, or by two wire feed solenoids electrically connected in parallel. The two longitudinal rows of staples U and V are different and must be individually controlled. Thus, there are three groups of wire feed mechanisms to be selectively controlled. Each of the solenoids 195, 196 and 197 in Figure 28 represents the one or more solenoids which control one of the groups of wire feed mechanisms.

The panel in Figure 29 also may be seen to require eight changes in stapling pattern along its length, which have been numbered 1' to 8' inclusive. The portions of the panels marked 4' and 6' each contain two identical lateral rows of staples, which require no change in pattern. Also, since the first and last lateral rows of staples in the panel are identical, no change in pattern is required between the last row of staples of a panel and the first row of the succeeding panel, and both the first and last rows of staples are accordingly marked "1'."

During the driving of the first row of staples, the first sequencing relay $a$, Figure 16, is energized to close its contacts $a8$, $a9$, and $a10$ (see Figure 28) and connect the first bank of switches 201, 202 and 203 to the wire feed solenoids 195, 196 and 197 respectively; since the pattern of staples in the panel of Figure 29 is such that in the first lateral row of staples all the stapling units should be effective to drive staples, all three switches 201, 202 and 203 are closed.

Between the formation of the first and second rows of staples in the panel, relay $b$ is energized and relay $a$ is de-energized, by means to be described hereinafter, so that contacts $b5$, $b6$ and $b7$ are closed to connect the second bank of switches 204, 205 and 206 to the wire feed solenoids 195, 196 and 197. Since the pattern requires that the stapling units for all three groups of longitudinal rows U, V and W, be ineffective to drive staples on the second stapling cycle, all three switches 204, 205 and 206 are open. In the third cycle, all stapling units drive staples and all three switches 207, 208 and 209 are closed. In the next two stapling cycles indicated by the numeral 4', only the stapling unit for the center row, V, is effective to drive staples, so that in the fourth bank of switches 210, 211, 212, only the center switch 211 is closed. In the following cycle indicated by the numeral 5', staples are driven by the units for the row V and for the two rows marked W, so that in the fifth bank of switches 213, 214 and 215, the latter two switches 214 and 215 are closed, and so on.

In the interval between the passage of adjacent box-part units through the machine, the staple formers and drivers of all the stapling units are rendered inoperative by the control circuit including the switches 46 (Figure 1) and 49 (Figure 9), as hereinabove described. This circuit is also effective to interrupt briefly the normal cyclical operation of the stapling units so as to allow variation in the longitudinal position of the lateral rows of staples, for example to cause the lateral rows to fall upon transverse cleat members of the panel, as above described.

The energization of the successive sequencing relays $a$—$h$ is accomplished by the portion of the circuit illustrated in Figure 16. This portion of the circuit comprises, in addition to the sequencing relays $a$—$h$, a starting relay $j$ (upper right), a cycle selector switch $k$ (having multiple sections at various points in the circuit), and an actuating switch $m$ (lower left). Where a pair of relay contacts are normally open, the armature associated with those contacts is shown below the contacts (see contacts $a1$, for example), and where the contacts are normally closed, is shown above the contacts (as at $b4$). The cycle selector switch $k$ is a manually operable four-position drum-type rotary switch having 13 sections. Adjacent the contacts of each section in Figure 16 is placed an encircled notation of the positions of the switch at which those contacts are closed. To facilitate understanding of the drawings, the portion of the circuit through which current is flowing at a given stage of operation is ruled in heavy lines. The portion of the circuit in the course of being closed is traced in broken lines.

The actuating switch $m$ may replace the switch 38 of Figure 9 and, like switch 38, be arranged to be operated by the actuating elements 28 on the side wall 27 of the pattern chain 24. This actuating switch $m$ is a single-pole double-throw switch having fixed contacts $m1$ and $m2$. In the first stapling cycle, the armature of switch $m$ is thrown to engage the contact $m1$, as shown in Figure 16. This completes the circuit shown in heavy lines in Figure 16, from one terminal of the electrical source through conductor 190, through the section k1 of cycle selector switch k (which, as indicated by the encircled numerals, is closed at all four positions of switch k), through contact m1 of actuating switch m, through section k3 of cycle selector switch k, through conductor 225, the normally closed contacts j2 of the starting relay j, and through the winding of the first sequencing relay a and the conductor 192 to the opposite terminal of the source. The relay a is thus energized; this closes its contacts a8, a9 and a10 (Figure 28) and energizes the solenoids 195, 196 and 197 through the closed selector switches 201, 202 and 203. The energization of relay a also closes its normally open contacts a1 and a2 to complete the circuit shown in broken lines, from conductor 190 and one terminal of the source through contacts a1 of relay a, the normally closed contacts b4 of relay b, and the contacts a2 of relay a, through the winding of relay a to the conductor 192 and the other terminal of the source. Thus, the circuit to relay a is closed through its own contacts a1 and a2 so that relay a remains energized until relay b is energized to open the contacts b4.

The energization of relay a also closes its contacts a7 to energize the winding of the starting relay j through the circuit shown in broken lines at the top of Figure 16. When the starting relay j is energized its contact j1 closes and maintains this relay energized as long as power is applied to the system.

Figure 17:
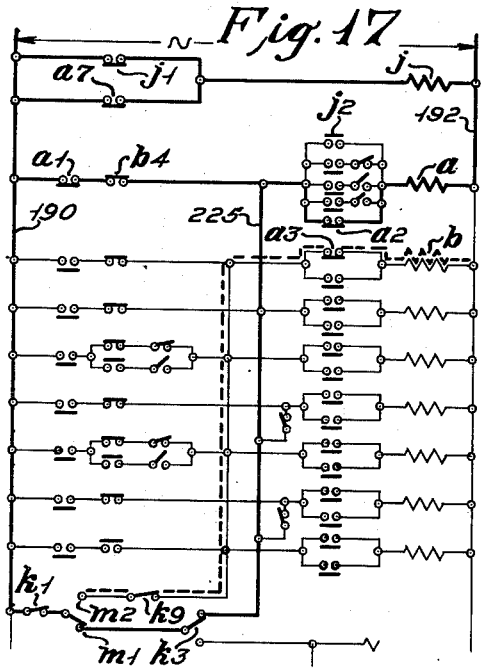

The "live" portions of the circuit are now as illustrated in heavy lines in Figure 17. As may be seen, the energization of relay a has closed its contacts a3 and prepared the circuit so that, as shown in broken lines in Figure 17, the next time the actuating switch m is thrown by a lug 28 on chain 24 to close its contacts m2, the second sequencing relay b will be energized.

Figure 18:
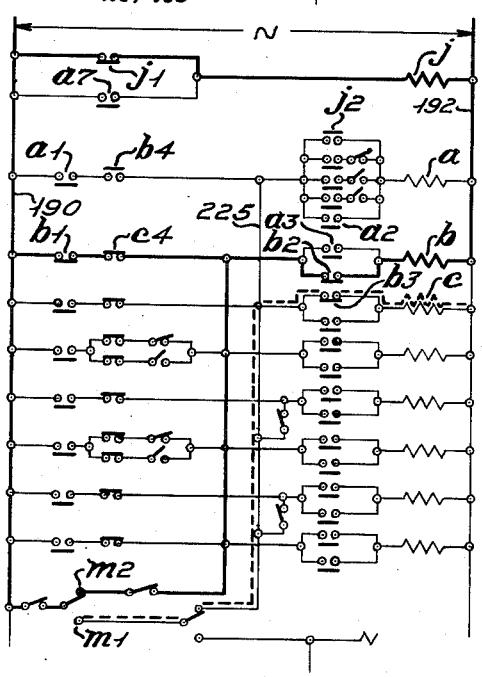

As shown in Figure 18, as soon as relay b is energized, its contacts b4 are opened to break the circuit to the winding of relay a and de-energize that relay. Also, the contacts b1 and b2 of relay b are closed to hold relay b energized after the opening of contacts a3 of relay a. And, as shown in broken lines in Figure 18, the contacts b3 are closed to prepare the circuit for energization of relay c when switch m is next thrown by chain 24 to close its contacts m1 for the second time. When the contacts m1 are closed this time, relay a is not energized because the contacts j2 of the starting relay j are now open (compare Figure 16).

Figure 19:
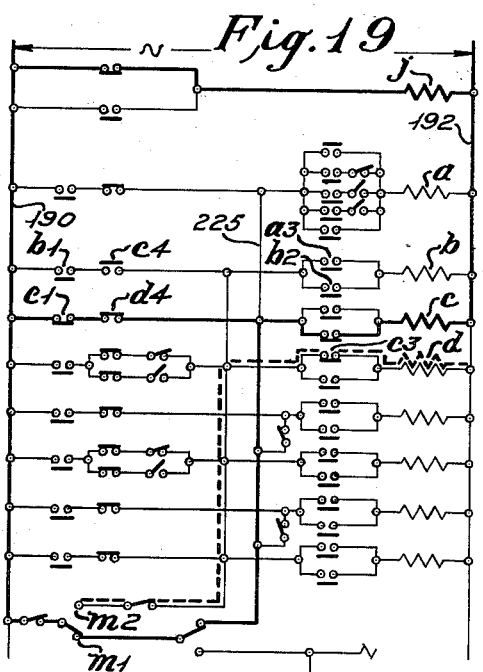

Referring now to Figure 19, the energization of relay c opens its normally closed contacts c4 and de-energizes relay b. It also closes contacts c3 and readies the circuit for energization of relay d when actuating switch m is next thrown to close contacts m2, as shown in broken lines in Figure 19.

Thus, each time the actuating switch m is closed, the relay following the one then energized is closed, which de-energizes the preceding relay and readies the circuit for energization of the succeeding relay the next time switch m is thrown.

Figure 20:
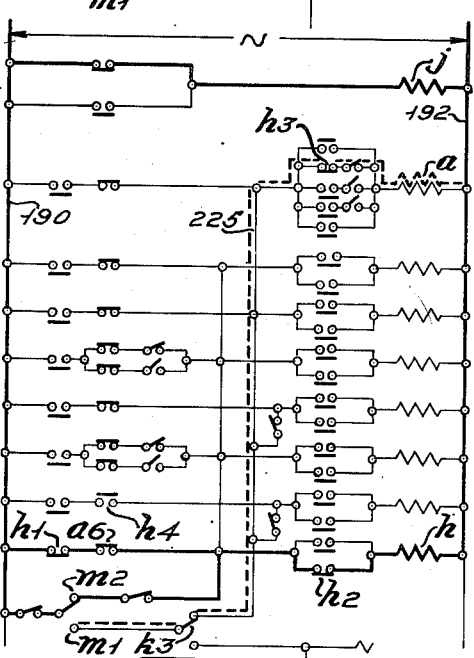

When the last relay in the sequence is energized the circuits readied for energization of relay a on the next actuation of switch m, and the sequence is repeated. Figure 20 illustrates the condition of the circuit when the cycle selector switch is set at position 4, for a cycle including all eight sequencing relays, and when the eighth and last relay h of the sequence is energized.

The contacts h3 of relay h are closed so that, as shown in broken lines, on the next actuation of switch m, relay a is energized through contacts h3 and the contacts k3 of cycle selector switch k. This will open the contacts a6 and deenergize relay h.

Conventional box panels require an even number of changes in the pattern of staples, that is either no pattern changes, or two, or four, and so on. A pair of pattern changes is conveniently referred to as an "on-off" cycle, and a panel that requires 8 pattern changes, as does the panel of Figure 29, is said to require 4 on-off cycles.

Where only one on-off cycle is required for a panel, all of the stapling units are simultaneously effective to drive staples, so that only one wire feed solenoid or parallel group of solenoids is needed. Thus, as seen in Figure 16, when the cycle selector switch k is set at position 1 for one on-off cycle, section k3 of switch k is thrown to connect contact m1 of the actuating switch m through conductor 194 to the wire feed solenoid 195 (Figure 28). Alternate actuations of switch m thus energize and de-energize wire feed solenoid 195, and/or a group of solenoids connected in parallel with it.

When two on-off cycles are required for a panel, and the cycle selector switch k is accordingly set at position 2, its contact k6 in the circuit of relay a is closed and its contact k5 in the circuit of relay e is open, so that closure of the fourth sequencing relay d (the last relay in a sequence of two on-off cycles) prepares the circuit (by closure of its contacts d5) for energization of relay a on the next actuation of switch k, rather than for energization of relay e, as for a sequence of more than 2 on-off cycles. The setting of switch k at position 2 also closes its contacts k12 and opens its contacts k13 so that relay d will be de-energized when relay a is energized and its contacts a4 are opened, rather than when relay e is energized and its contacts e4 are opened. A similar arrangement may be seen to be provided for the sixth relay f to allow recycling after energization thereof, if desired.

Whenever power is removed from the circuit all of the relays including the starting relay j are deenergized. When operation is resumed, the sequence is started again at the first relay a, as above described in connection with Figure 16.

It will thus be seen that the circuit provides means for selectively controlling the feed of wire to as many as three groups of stapling units, and allows up to eight changes in stapling pattern per box-part unit.

Additional pattern changes may be accommodated by adding relays, and selective control of additional groups of stapling units may be accomplished by merely adding one or more contacts to each sequencing relay and a like number of selector switches to each bank.

In Figures 21 and 30 is shown an alternative form of solenoid sequencing circuit which, like the circuit just described, allows changing of the pattern by the mere resetting of switches, but which eliminates the need of a pattern chain for wire feed control. Whereas in the circuit just described, a new relay in the sequence is energized for each pattern change, in the circuit of Figures 21 and 30, a new relay is energized each stapling cycle. The circuit is likewise divided into two portions, the portion shown in Figure 21 containing the twelve sequencing relays n—z and the portion in Figure 30 containing the thirty-six manually operable pattern selector switches 231—266. The two conductors 280 and 282 are common to both figures and are connected, as shown, to the respective terminals of a source of electrical power.

The pattern selector switches are shown as set for making the crate panel illustrated in Figure 31. This panel has three longitudinal rows of staples X, Y, and Z (thus requiring three stapling units) and twelve lateral rows of staples, numbered 1" through 12". The wire feed solenoids 271, 272 and 273 are each associated with one of the three stapling units. At each stapling cycle, a different bank of pattern selector switches is connected to control the wire feed solenoids.

In the first two stapling cycles, all the stapling units drive staples, so that all three switches of each of the first two banks of selector switches are closed. In the third stapling cycle, only the stapling unit associated with the left-hand row of staples X, drives a staple, so that in the third bank of switches only the first switch is closed, and so on.

The successive energization of the sequencing relays n—z, thereby connecting successive banks of selector switches to the wire feed solenoids, is accomplished by the portion of the circuit illustrated in Figure 21. In addition to the sequencing relays n—z, this portion of the circuit comprises a starting relay J (upper center), a manually operable multiple section cycle selector switch K, and an actuating switch M (having two sections, one at the upper left and one at the upper right). The same conventions used in illustrating the circuit of Figures 16 and 28 have been used in Figures 21 and 31.

One of the sections M1, 2 of the actuating switch M is a momentary contact single-pole double-throw switch and the other M3 is a momentary contact, normally open, single-pole single-throw switch. Actuating switch M is arranged so that it is actuated once each stapling cycle. This is accomplished, for example, by positioning switch M with its operating plunger adjacent one of the cams 304 on the shaft 122 (Figure 15), or a separate cam which may be provided on this shaft, or adjacent the rocker arm 117 or 118, or any other of the many parts of the machine which make one revolution or oscillation during each stapling cycle. In this manner, once each stapling cycle the actuating switch M is momentarily thrown to open contacts M1 and close contacts M2 and M3, as shown in Figure 21. On the first cycle of operation, this energizes the first sequencing relay n through the heavily ruled circuit including contacts M2, the normally closed contacts J1 of starting relay J and the normally closed contacts p1 of the second sequencing relay p. Energization of relay n closes contacts n2 so that relay n is held energized through the circuit shown in broken lines in Figure 21.

As shown in heavy lines in Figure 22, when the actuating switch then returns to its normal position at which contacts M1 are closed, the starting relay J is energized through contacts M1 and contacts n6 of the first sequencing relay n. As shown in broken lines, as soon as the starting relay J closes, its circuit is closed through its own contacts J2 and it will remain energized as long as power is applied. The energization of starting relay J closes its contacts J3 and readies the circuit for the energization of the second sequencing relay p on the next actuation of switch M. If it were not for these normally open contacts J3 in the circuit of relay p, this relay would close as soon as the preceding relay n had closed (on the first actuation of switch M), causing the first stapling cycle to be omitted from the pattern.

On the second actuation of switch M, as shown in Figure 23, the next sequencing relay p is energized through the heavily ruled circuit including the normally closed contacts z5 of the sequencing relay z, contacts K18 of cycle selector switch K, contacts J3 of starting relay J, contacts n4 of the first relay n, and the normally closed contacts q1 of the third relay q.

As shown in broken lines in Figure 23, this energization of relay p closes its contacts p2 and, through contacts q1 of the sequencing relay q, maintains relay p energized even after switch M has returned to normal position, as shown in heavy lines in Figure 24. Referring again to Figure 23, the energization of relay p also opens its contacts p1 in the circuit of the preceding relay n, but this does not de-energize relay n as long as the switch M is closed, the circuit to relay n still being complete, as shown in heavy lines, through its own contacts n2 and n3 and switch M3. This insures that the preceding relay n remains closed until after the succeeding relay p has closed so that, if the selector switches in the first two banks of selector switches 201—206 (Figure 30) are set for the feeding of wire to a given stapling unit during successive stapling cycles, the wire feed is not interrupted between cycles and a full length of wire is fed for each cycle. As shown in Figure 24, as soon as the actuating switch M returns to its normal position, the opening of its contact M3 de-energizes relay n.

The energization of relay p also closes its contacts p4 in the circuit of relay q (see Figure 23), but relay q cannot close as long as relay n is energized, since the normally closed contacts n5 of relay n are open to break the circuit to relay q. As above noted, relay n will remain closed until the actuating switch M returns to normal position. Thus, relay q is not energized until the third time switch M is actuated. Were it not for these contacts n5, and the similar contacts p5, q5, etc. associated with the subsequent relays in the sequence, on the second actuation of switch M, not only would relay p be energized, but as soon as its contacts p4 were closed, relay q would be energized, then relay r and so on, as long as the contacts M2 of switch M were held closed, creating a "runaway" condition of the circuit.

As soon as switch M returns to normal position, relay n is de-energized, as shown in Figure 24.

Upon the next actuation of switch M, as shown in Figure 25, relay q is energized through the circuit including the normally closed contacts n5 of relay n, contacts p4 of the preceding relay p and the normally closed contacts r1 of the succeeding relay r. The energization of relay q opens its contacts q1 in the circuit of relay p, but relay p is not de-energized until the actuating switch M returns to normal position, the circuit to relay p being closed through its contacts p2 and p3 and the contacts M3 of switch M as shown.

Referring now to Figure 26, return of switch M to normal position opens its contacts M3 and de-energizes relay p. This opens the contacts p4 in the circuit of relay q, but relay q is held closed since its circuit is still complete through its contacts q2 and the normally closed contacts r1 of the succeeding relay r.

Thus, each time the switch M is actuated, the succeeding sequencing relay is energized to connect another bank of selector switches (Figure 30) to control the wire feed solenoids.

After the last relay in the sequence has been energized, the next actuation of switch M energizes the first relay n to repeat the cycle. The circuit as shown in Figures 21-27 has been set for u pattern of twelve stapling cycles. In Figure 27, the circuit is illustrated in the condition wherein the final sequencing relay z has been energized. As shown in broken lines, on the next acthation of switch M, relay n is energized through the normally closed contacts y5 of relay y, section M16 of cycle selector switch M, contacts z4 of relay z, and the normally closed contacts p1 of relay p. Energization of relay n will open its contacts n1 in the circuit of relay z and de-energize relay z as soon as the contacts M3 are opened by a return of the actuating switch M to normal position. The condition of the circuit will then be exactly as was shown in Figure 22, so that the thirteenth stapling cycle is identical with the first, and so on.

The cycle selector switch K may be set for a pattern involving a lesser number than twelve stapling cycles if desired. Referring again to Figure 21, if the cycle selector switch K is set, for example, for a pattern of only four stapling cycles, its section K1 in the circuit of the fifth relay s is thrown from the upper position in which it is shown to the lower position (as indicated by the encircled numeral 4). Thus, when the last relay of the 4-cycle sequence, relay r, is energized and its contacts r4 thereby closed, the next actuation of switch M, rather than energizing the fifth relay s, will energize the first relay n, through the normally closed contacts q5 of relay q, contacts r4 of the fourth relay r, the lower fixed contact of section K1 of cycle selector switch K, through the conductor 275, and the normally closed contacts p1 of relay p.

The setting of the cycle selector switch K at position 4 will also throw its section K19 in the circuit of the fourth relay r from the upper position, in which it is shown, to the lower position. The circuit to winding of the fourth relay r is now through the conductor 275 and the normally closed contacts of the first relay n rather than through the normally closed contacts s1 of the fifth relay s. Thus, the fourth relay r will be de-energized by the energization of the first relay n (and the opening of its contacts n1) rather than by the energization of the fifth relay s (and the opening of its contacts s1).

The pattern will accordingly be repeated after only four stapling cycles.

The circuit of each of the relays from the fourth through the eleventh includes sections of the cycle selector switch K similarly arranged as are the sections K1 and K19 just described to allow setting of the circuit to repeat the pattern after any number of stapling cycles from four through twelve.

It will thus be appreciated that the circuit allows rapid selection of any stapling pattern involving up to twelve stapling cycles and requiring selective control of up to three groups of stapling units. Additional stapling cycles and groups of stapling units may be provided by increasing the number of sequencing relays and the number of contacts of each, as well as the number of selector switches. This, in combination with the ability to vary the longitudinal position of the staples in any given stapling cycle by interrupting the operation of all the stapling units as above described, makes possible the driving of staples in any conceivable pattern involving a single row of stapling units. There will thus be seen to have been provided mechanism by which the aforementioned and other desirable objects may be achieved.

However, as many possible embodiments may be made of the above invention, and as many changes may be made in the embodiments above set forth, it is to be understood that all matter hereinbefore set forth or shown in the accompanying drawings is to be interpreted as illustrative only and not in a limiting sense.

I claim:

1. In a box-making machine having a moving conveyor for feeding box-part units and a plurality of stapling units spaced laterally of said conveyor for forming staples from wire fed thereto and for driving said staples into said box-part units, the combination therewith of means for driving said stapling units, a stapling unit drive control mechanism associated with said driving means and operable to render said driving means effective to drive said stapling units, a first pattern control assembly having a plurality of control elements adapted for successive control of said drive control mechanism, the condition of said control elements being variable to effect interruption of the operation of said stapling units as desired, a wire feed mechanism associated with each of said stapling units, a feed control mechanism associated with one or more of said wire feed mechanisms and operable to render said wire feed mechanisms operative to feed wire thereby to render the associated stapling units effective to drive staples, and a second pattern control assembly having a plurality of control elements adapted for successive control of one or more of said feed control mechanisms, the condition of said control elements being variable to render said wire feed mechanisms operative to feed wire, whereby to allow variation in the spacing of staples in the longitudinal rows of staples in said box-part units and omission of staples from one or more of said longitudinal rows of staples as desired.

2. In a box-making machine having a moving conveyor for feeding box-part units and having a plurality of stapling units spaced laterally of said conveyor for forming staples from wire fed thereto and for driving said staples into said box-part units, the combination of variable pattern-controlled means to operate said stapling units at predetermined variable intervals whereby the spacing of staples in the longitudinal rows of staples in said box-part units may be varied, means to feed wire to each of said stapling units, and variable pattern-controlled means to interrupt the feed of wire to one or more of said stapling units while maintaining the feed of wire to another of said stapling units whereby the number of staples in one or more longitudinal rows of staples in said box-part units may be reduced without reducing the number of staples in another row of staples in said box-part units.

3. In a box-making machine having a moving conveyor for feeding box-part units and a plurality of stapling units spaced laterally of said conveyor for forming staples from wire fed thereto and for driving said staples into said box-part units, the combination therewith of a source of driving power, a clutch arranged to connect said source of power to said stapling units, control means to control said clutch whereby to disconnect said stapling units from said source of power and vary the longitudinal spacing of staples driven in said box-part units, a first pattern holder carrying operating parts adapted to operate said control means, the positions of said operating parts on said pattern holder being variable in accordance with the desired pattern of staples in said box-part units, means to move said first pattern holder relatively to said control means, a wire feed mechanism associated with each stapling unit, electrically-operated feed control mechanism associated with each of said wire feed mechanisms and operable to render selected wire feed mechanisms operative to feed wire thereby to render the associated stapling units effective to drive staples, a switch connected to operate said feed control mechanism, a second pattern holder carrying operating parts adapted to operate said switch, and means to move said pattern holder relatively to said switch whereby staples may be selectively omitted in any of the longitudinal rows of staples in said box-part units.

4. A box-making machine as claimed in claim 1 in which the wire feed mechanism comprises a knurled roller adapted to be driven by said source of power, and a knurled tension roller, said rollers being adapted to engage a wire to feed the same and said feed control mechanism including a lever for moving said tension roller into and out of feeding engagement with said wire, and a motor for operating said lever under the control of said switch.

5. A box-making machine as claimed in claim 3 in which the said pattern holders are driven in synchronism with said moving conveyer.

6. A box-making machine as claimed in claim 1 and in which the feed control mechanism includes a solenoid motor for throwing said feed mechanism into and out of wire feeding positions.

7. A box-making machine such as claimed in claim 1 and in which a pneumatically-operated motor operates on said feed mechanism to throw it into and out of wire feeding position, and a magnetically-operated air valve operated by said switch controls air flow to said pneumatic motor.

8. A box-making machine as claimed in claim 3 in which said first and second pattern holders form part of an endless roller chain assembly.

9. In a box-making machine having a moving conveyor for feeding box-part units and a plurality of stapling units spaced laterally of said conveyor for forming staples from wire fed thereto and for driving said staples into said box-part units, the combination therewith of a source of driving power, an electrically-operated clutch arranged to connect said stapling units to said source of power, a first switch connected to control said clutch whereby to make or break the connection between said stapling units and said source of power whereby to vary the longitudinal spacing of staples driven in said box-part units, a first pattern holder carrying operating parts adapted to operate said first switch, the positions of said operating parts being variable in accordance with the desired pattern of staples in said box-part units, means to move said pattern holder relatively to said first switch, a wire feed mechanism associated with each stapling unit, electrically-operated feed control mechanism associated with each of said wire feed mechanisms and operable to render selected wire feed mechanisms operative to feed wire thereby to render the associated stapling units effective to drive staples, a second switch connected to operate said feed control mechanism, a second pattern holder carrying operating parts adapted to operate said switch, and means to move said second pattern holder relatively to said switch whereby staples may be selectively omitted in any of the longitudinal rows of staples in said box-part units.

10. A machine as claimed in claim 9 in which said wire feed mechanisms are driven by said source of power through said clutch, whereby said clutch simultaneously controls not only the operation of said stapling units but also the feed of wire thereto.

11. In a box-making machine having a moving conveyor for feeding box-part units and a plurality of stapling units spaced laterally of said conveyor for forming staples from wire strands fed thereto and for driving said staples into said box-part units, the combination therewith of a source of driving power, an electrically-controlled clutch arranged to connect said stapling units to said source of power, a first switch connected to engage or disengage said clutch whereby to vary the longituidnal spacing of staples driven in said box-part units, a first pattern holder carrying operating parts adapted to operate said first switch, the positions of said operating parts being variable in accordance with the desired pattern of staples in said box-part units, a wire feed mechanism associated with each stapling unit, electrically-operated feed control mechanism associated with each of said wire feed mechanisms and operable to render selected wire feed mechanisms operative to feed wire thereby to render the associated stapling units effective to drive staples, a second switch connected to operate said feed control mechanism, a second pattern holder carrying operating parts adapted to operate said switch, an electrically-operated clutch arranged to connect said first and second pattern holders to said source of power to drive said pattern holders past said first and second switches respectively, third and fourth switches connected in parallel to operate said clutch, a switch-operating part mounted for movement with said pattern holders and arranged to operate said third switch to stop the movement of said pattern holders after one cycle of movement thereof, and a switch-operating part mounted for movement with said conveyor and arranged to operate said fourth switch to initiate the cycle of movement of said pattern holders upon the arrival of a box-part unit at said stapling units.

12. In a box-making machine having a moving conveyor for feeding box-part units and a plurality of stapling units spaced laterally of said conveyor for forming staples from wire fed thereto and for driving said staples into said box-part units, the combination therewith of a wire feed mechanism associated with each of said stapling units, electrically-operated feed control mechanism associated with each of said wire feed mechanisms and operable to render said wire feed mechanism operative to feed wire thereby to render the associated stapling units effective to drive staples, a plurality of banks of pattern selector switches, and an electrical sequencing circuit arranged to connect successive banks of said pattern selector switches to said feed control mechanisms, whereby each switch in the bank so connected renders one or more wire feed mechanisms effective to feed wire to the associated stapling units depending upon the setting of said selector switch.

13. In a box-making machine having a moving conveyor for feeding box-part units and a plurality of stapling units spaced lateraly of said conveyor for forming staples from wire fed thereto and for driving said staples into said box-part units, the combination therewith of a wire feed mechanism associated with each of said stapling units, electrically-operated feed control mechanism associated with each of said wire feed mechanisms and operable to render said wire feed mechanism operative to feed wire thereby to render the associated stapling units effective to drive staples, a plurality of banks of pattern selector switches, an actuating switch arranged to be actuated at intervals during the operation of said stapling units and a plurality of electrical relays so connected to said actuating switch and to each other that each operation of said actuating switch closes the circuit to one of said relays which relay in turn opens the circuit to the next preceding relay in the sequence and readies the circuit for energization of the next succeeding relay in the sequence upon the next operation of said actuating switch, said relays being arranged to connect successive banks of said selector switches to said feed control mechanisms, whereby each selector switch in the bank so connected renders one or more wire feed mechanisms effective to feed wire to the associated stapling unit depending upon the setting of said selector switch.

14. In a box-making machine having a moving conveyor for feeding box-part units and a plurality of stapling units spaced laterally of said conveyor for forming staples from wire fed thereto and for driving said staples into said box-part units, the combination therewith of a wire feed mechanism associated with each of said stapling units, electrically-operated feed control mechanism associated with each of said wire feed mechanisms and operable to render said wire feed mechanism operative to feed wire thereby to render the associated stapling units effective to drive staples, a plurality of banks of pattern selector switches, an actuating switch arranged to be actuated at intervals during the operation of said stapling units and a plurality of electrical relays so connected to said actuating switch and to each other that each operation of said actuating switch closes the circuit to one of said relays which relay in turn opens the circuit to the next preceding relay in the sequence and readies the circuit for energization of the next succeeding relay in the sequence upon the next operation of said actuating switch, said relays being arranged to connect successive banks of said selector switches to said feed control mechanisms, whereby each selector switch in the bank so connected renders one or more wire feed mechanisms effective to feed wire to the associated stapling unit depending upon the setting of said selector switch, a pattern holder having operating parts adapted to operate said actuating switch, the positions of said operating parts being variable in accordance with the desired pattern of staples in said box-part units, and means to move said pattern holder relatively to said actuating switch and in synchronism with said moving conveyor, whereby to allow the selective omission of staples from one or more groups of longitudinal rows of staples in a box-part unit.

15. In a box-making machine having a moving conveyor for feeding box-part units and a plurality of stapling units spaced laterally of said conveyor for forming staples from wire fed thereto and for driving said staples into said box-part units, the combination therewith of a wire feed mechanism associated with each of said stapling units, electrically-operated feed control mechanism associated with each of said wire feed mechanisms and operable to render said wire feed mechanism operative to feed wire thereby to render the associated stapling units effective to drive staples, a plurality of banks of pattern selector switches, an actuating switch, a plurality of electrical relays so connected to said actuating switch and to each other that each operation of said actuating switch closes the circuit to one of said relays which relay in turn opens the circuit to the next preceding relay in the sequence and readies the circuit for energization of the next succeeding relay in the sequence upon the next operation of said actuating switch, said relays being arranged to connect successive banks of said selector switches to said feed control mechanisms, whereby each selector switch in the bank so connected renders one or more wire feed mechanisms effective to feed wire to the associated stapling unit depending upon the setting of said selector switch, and means associated with said stapling units to operate said actuating switch once for each cycle of operation of said stapling units.

16. In a box-making machine having a moving conveyor for feeding box-part units and a plurality of stapling units spaced laterally of said conveyor for forming staples from wire fed thereto and for driving said staples into said box-part units, the combination therewith of a wire feed mechanism associated with each of said stapling units, electrically-operated feed control mechanism associated with each of said wire feed mechanisms and operable to render said wire feed mechanism operative to feed wire thereby to render the associated stapling units effective to drive staples, a switch connected to operate said feed control mechanism, a pattern holder carrying operating parts adapted to operate said switch, said pattern holder having or omitting operating parts at incremental positions along its length depending upon the desired pattern of staples in said box-part units, and means to move said pattern holder relatively to said switch and in synchonism with the operation of said stapling units, whereby to allow the selective omission of staples from one or more groups of longitudinal rows of staples in a box-part unit.

17. In a box-making machine having a moving conveyor for feeding box-part units and a plurality of stapling units spaced laterally of said conveyor for forming staples from wire fed thereto and for driving said staples into said box-part units, the combination therewith of a wire feed mechanism associated with each of said stapling units, electrically-operated feed control mechanism associated with each of said wire feed mechanisms and operable to render said wire feed mechanism operative to feed wire thereby to render the associated stapling units effective to drive staples, a switch connected to operate said feed control mechanism, a cam adapted to operate said switch, a pattern holder carrying adjustably positioned operating parts arranged to index said cam at each change of the desired pattern of staples in said box-part units and means to move said pattern holder relatively to said switch in synchronism with the movement of said conveyor, whereby to allow the selective omission of staples from one or more longitudinal rows of staples in a box-part unit.

18. In a box-making machine having a moving conveyor for feeding box-part units and a plurality of stapling units spaced laterally of said conveyor for forming staples from wire fed thereto and for driving said staples into said box-part units, the combination therewith of a wire feed mechanism associated with each of said stapling units, electrically-operated feed control mechanism associated with each of said wire feed mechanisms and operable to render said wire feed mechanism operative to feed wire thereby to render the associated stapling units effective to drive staples, a plurality of switches, each connected to operate the feed control mechanism associated with one or more of said stapling units, a plurality of cams, each adapted to operate one of said switches, a pattern holder carrying adjustably positioned operating parts arranged to index said cams at each change of the desired pattern of staples in said box-part units, and means to move said pattern holder relatively to said switches in synchronism with the movement of said conveyor, whereby to allow the selective omission of staples from one or more groups of longitudinal rows of staples in a box-part unit.

19. In a box-making machine having a moving conveyor for feeding box-part units and a plurality of stapling units spaced laterally of said conveyor for forming staples from wire fed thereto and for driving said staples into said box-part units, the combination therewith of a wire feed mechanism associated with each of said stapling units, electrically operated feed control mechanism associated with each of said wire feed mechanisms and operable to render said wire feed mechanism operative to feed wire thereby to render the associated stapling units effective to drive staples, a plurality of banks of pattern selector switches, an actuating switch arranged to be actuated at intervals during the operation of said stapling units, a plurality of electrical relays so connected to said actuating switch and to each other that each operation of said actuating switch closes the circuit to one of said relays which relay in turn opens the circuit to the next preceding relay in the sequence and readies the circuit for energization of the next succeeding relay in the sequence upon the next operation of said actuating switch, a cycle selector switch operable to connect the first relay in the sequence to any selected one of a plurality of the other relays in such way that the closure of such selected relay readies the circuit for the energization of said first relay on the next operation of said actuating switch rather than readying the circuit for the energization of the relay following said selected relay in the sequence, and so that the circuit to said selected relay is opened by the closure of said first relay rather than by the closure of the relay following said selected relay, thereby causing reactuation of said first relay after actuation of said selected relay and allowing a repetitive sequence involving a variable number of said relays, as desired, said relays being arranged to connect successive banks of said selector switches to said feed control mechanisms, whereby each selector switch in the bank so connected renders one or more wire feed mechanisms effective to feed wire to the associated stapling unit depending upon the setting of said selector switch.

DAVID G. KINGSLEY.

REFERENCES CITED

The following references are of record in the file of this patent:

UNITED STATES PATENTS

| Number | Name | Date |
| --- | --- | --- |
| 2,482,370 | Rosenmund | Sept. 20, 1949 |